(12) United States Patent
Pham

(10) Patent No.: US 11,766,705 B2
(45) Date of Patent: Sep. 26, 2023

(54) SYNTHETIC SOIL AND METHODS FOR PRODUCING SAME FROM WASTE

(71) Applicant: Hung Van Pham, Ho Chi Minh (VN)

(72) Inventor: Hung Van Pham, Ho Chi Minh (VN)

(73) Assignee: HK BROTHERS AMERICA LLC, Camden, DE (US)

( * ) Notice: Subject to any disclaimer, the term of this patent is extended or adjusted under 35 U.S.C. 154(b) by 175 days.

(21) Appl. No.: 17/119,477

(22) Filed: Dec. 11, 2020

(65) Prior Publication Data

US 2021/0178438 A1 Jun. 17, 2021

Related U.S. Application Data

(60) Provisional application No. 62/946,665, filed on Dec. 11, 2019.

(51) Int. Cl.
*B09B 3/25* (2022.01)
*C04B 32/00* (2006.01)
*B09B 101/30* (2022.01)

(52) U.S. Cl.
CPC ............ *B09B 3/25* (2022.01); *C04B 32/00* (2013.01); *B09B 2101/30* (2022.01)

(58) Field of Classification Search
None
See application file for complete search history.

(56) References Cited

U.S. PATENT DOCUMENTS

| | | | |
|---|---|---|---|
| 3,915,853 A * | 10/1975 | Luck | C02F 3/34 210/764 |
| 4,050,917 A | 9/1977 | Varro | |
| 4,164,405 A | 8/1979 | Pinckard | |
| 4,369,054 A | 1/1983 | Shinholster, Jr. et al. | |
| 5,192,354 A | 3/1993 | Drysdale et al. | |
| 5,312,661 A | 5/1994 | Suzuki et al. | |
| 6,488,732 B2 | 12/2002 | Scanlan | |
| 8,501,125 B2 | 8/2013 | Vandor | |
| 10,000,428 B2 | 6/2018 | Green | |
| 10,351,482 B1 | 7/2019 | Nanis et al. | |
| 2015/0107319 A1 | 4/2015 | Vonderwell et al. | |
| 2022/0314584 A1 * | 10/2022 | Lakrout | B32B 27/065 |

FOREIGN PATENT DOCUMENTS

| | | |
|---|---|---|
| CN | 104312591 | 1/2015 |
| CN | 105801293 | 7/2016 |
| CN | 109046297 | * 12/2018 |
| CN | 109111323 | * 1/2019 |
| JP | 59-086687 | 5/1984 |
| KR | 10-2018-0100008 | 9/2018 |

OTHER PUBLICATIONS

ACS Energy Letters. "The pH of Aqueous NaOH/KOH Solutions: A Critical and Non-Trivial Parameter for Electrocatalysis". 6, 3567-3571 (2021). (Year: 2021).*
Pyrbabubgtuas et al. "The effect of aging temperature . . . ". AIP. Conf Proceedings. 1911 (2017) (Year: 2017).*
Maia, et al. "Influence of an aging step on the synthesis . . . ". J. Mater Res. Technol. 8 (3), 2924-2929 (2019). (Year: 2019).*
International Search Report issued in PCT/IB2020/061786, dated Apr. 30, 2021.

* cited by examiner

*Primary Examiner* — Sheng H Davis
(74) *Attorney, Agent, or Firm* — Ice Miller LLP

(57) ABSTRACT

The present disclosure provides efficient and cost-effective methods for producing synthetic soil and synthetic stone from waste, including inorganic waste and organic waste, through a hydrolysis-polycondensation process.

15 Claims, 6 Drawing Sheets

| Gabion filled with rocks | Casting with binder | Synthetic stone bloc |

SYNTHETIC SOIL AND METHODS FOR PRODUCING SAME FROM WASTE

CROSS REFERENCE TO RELATED APPLICATION

The present application claims priority to U.S. patent application No. 62/946,665, filed Dec. 11, 2019, which is hereby incorporated by reference in its entirety.

TECHNICAL FIELD

The present disclosure relates to methods of processing waste, in particular methods for producing synthetic soil from waste. The present disclosure also relates to synthetic soil produced from waste.

BACKGROUND

The current world population is 7.7 billion. During the 20th century alone, the population in the world has grown from 1.65 billion to 6 billion. The average population increase is estimated at 82 million people, a rate of around 1.08%, per year. However, the agricultural land area has been decreasing due to urbanization which has absorbed farmland for commercial, residential and industrial development. To secure more food supply, forestland is converted into cropland which has been excessively exploited or overused with chemical fertilizers and insecticides. The soil related sectors, such as agriculture, forestry and land use, account for approximately 24% of greenhouse gas (GHG) emission. Microbes in contact with chemical fertilizers and natural manure generate nitrous oxide, a major contributor to global warming.

Every year we generate 2.12 billion tons of waste globally, including post-consumer, agricultural, and industrial waste. A significant amount of waste is untreated or treated improperly, causing serious pollution and occupying large land areas. For example, an aluminum plant typically produces more than 1 million tons of red mud per year. The red mud is typically stockpiled onsite, resulting in the accumulation of ever-increasing amounts of red mud at the plant site. Between 0.7-2 tons of red mud are produced for every ton of alumina extracted, depending on the composition of the bauxite. The two basic methods of onsite disposal are wet discharge (dumping of the water mud in lakes) and dry stacking (landfill of the dried, thickened red mud).

Many of the industrial processes that cause $CO_2$ emissions also pollute the environment. For instance, heavy metals become concentrated or enriched in many industrial wastes, such as the red mud that is the byproduct of aluminum refining; or fly ash and bottom ash that are the byproducts of coal combustion; or ash from municipal solid waste (MSW) incinerators, where the ash is the byproduct of burned municipal waste. In all of those and other similar waste streams, trace metals are present at the parts-per-million (ppm) level. An environmental burden can be created when these metals leach from ash or red mud containment areas. Most of the metals found in ashes (and in red mud) are toxic, even at low ppm concentration levels. Chemically, such metals are members of all but two groups of the periodic table, with common examples being arsenic, mercury, lead, uranium, vanadium and nickel. This creates special needs for the disposal of fly ashes (and bottom ash and red mud) and establishes a significant environmental burden.

In addition, the waste disposal is accounting for approximately 11% of global GHG emission, contributing to global warming. Soil contains organic bodies that change with time, metabolize and ultimately die. As global warming worsens, the soil organic matter (SOM) releases faster and eventually the soil can become a sterile mixture of minerals that fails to support life.

Various processes are known for treating waste, including incineration and composting. Composting or recycling waste materials to produce soil-like growing medium or similar products are described in various patents. U.S. Pat. No. 5,312,661 discloses artificial soil made from thermoplastic resin foamed particles, where thermoplastic resin foamed particles and fine substances are bonded to each other by heat fusion of the thermoplastic resin foamed particles to form a porous structure. U.S. Pat. No. 5,192,354 relates to soil substitutes produced from shredded tree bark, quarry stone particles and silica sand particles. Composting is performed by laying out the mixture in windrows and aerating the shredded tree bark by mechanically turning material in the windrows so that composting proceeds within the temperature range of 42-60 degrees Celsius. U.S. Pat. No. 4,050,917 discloses a method of composting wastes by controlling aeration, pH, moisture content and temperature during composting. U.S. Pat. No. 4,369,054 discloses a composition of pulped fibers and slag. U.S. Pat. No. 4,164,405 discloses a method for controlling fungi that utilizes aerobically fermented cotton gin waste. U.S. Pat. No. 6,488,732 relates to plant growth media composed primarily of coffee grounds, along with other commercial and industrial waste materials.

However, there are many drawbacks associated with these reported methods. For instance, the composting time is very long, taking months or even years. The decomposition is not complete resulting in additional decomposition of the organic matters by microbes, thus emitting GHG. The resulting artificial soil contains heavy metals and metalloids, pathogens, vectors and weed seeds which are harmful for plants and *rhizobia*. Additionally, foams used for binding are not degradable. As no adhesion exists between the soil particles, they can easily be eroded away to pollute rivers and oceans.

Other methods for waste treatment include 3R (recycle, reduce and recovery) which however cannot process economically and safely the large quantity of waste generated today. The conventional methods to handle animal manure and liquid waste products from poultry and livestock production facilities do not address some health and environmental concerns.

Organic and inorganic waste contains valuable nutrients and there is a need for processing waste to provide useful products. There is also a need for environmentally friendly alternatives to conventional fertilizers for crops. Thus, methods to regenerate soil from waste is urgently needed.

The present disclosure provides methods for processing waste to produce synthetic soil. The present methods efficiently convert a large amount of industrial, agricultural and residential waste into synthetic soil that could help lessen acute environmental pollution and global warming. Synthetic soil is extremely important to a sustainable future for all mankind.

SUMMARY

The present disclosure provides for a method for producing a synthetic soil from waste.

The method may comprise: (a) hydrolyzing an organic waste composition using a hydrolyzing composition to produce a biomaterial; (b) activating an inorganic waste composition using an alkaline activator to produce a reactive zeolite gel; and (c) mixing the biomaterial with the reactive zeolite gel to produce the synthetic soil.

In certain embodiments, the method may comprise: (a) hydrolyzing an organic waste composition using a hydrolyzing composition to produce a biomaterial; and (b) mixing the biomaterial with an inorganic waste composition to produce the synthetic soil.

In certain embodiments, the hydrolyzing composition has a pH ranging from about pH13 to about pH14.

In certain embodiments, the alkaline activator has a pH ranging from about pH13 to about pH14.

A solvent may be added during any step(s) of the method. In one embodiment, the solvent is water.

The hydrolyzing composition may comprise alkali-activated red mud. The hydrolyzing composition may comprise sodium hydroxide (NaOH), potassium hydroxide (KOH), sodium bicarbonate ($NaHCO_3$), sodium silicate ($Na_2SiO_3$), or combinations thereof.

In certain embodiments, the hydrolyzing composition comprises NaOH, KOH, $NaHCO_3$, sodium silicate, and/or sodium metasilicate ($Na_2SiO_3$), where NaOH, KOH, $NaHCO_3$, sodium silicate, or $Na_2SiO_3$ may be at a concentration ranging from about 1 to about 5 wt %, from about 1.5 to about 4.5 wt %, from about 1.5 to about 4 wt %, from about 1.5 to about 3.5 wt %, from about 1.5 to about 3 wt %, from about 1.5 to about 2.5 wt %, from about 1.5 to about 2.0 wt %, or from about 2.0 to about 2.5 wt %.

The hydrolyzing composition may further comprise one or more catalysts and/or additives.

In certain embodiments, the hydrolyzing composition is added to an organic waste composition to reach an initial concentration of NaOH, KOH, $NaHCO_3$, sodium silicate, or $Na_2SiO_3$ ranging from about 0.1 to about 2 wt %, from about 0.1 to about 1.5 wt %, from about 0.1 to about 1 wt %, from about 0.1 to about 0.9 wt %, from about 0.1 to about 0.8 wt %, from about 0.1 to about 0.7 wt %, from about 0.1 to about 0.6 wt %, from about 0.2 to about 0.9 wt %, from about 0.2 to about 0.8 wt %, from about 0.2 to about 0.7 wt %, from about 0.2 to about 0.5 wt %, from about 0.1 to 0.5 wt %, or from about 0.2 to 0.6 wt %.

In certain embodiments, when the hydrolyzing composition is added to an organic waste composition, the volume ratio of the organic waste composition to the hydrolyzing composition may range from about 2:1 to about 50:1, from about 2:1 to about 40:1, from about 2:1 to about 30:1, from about 2:1 to about 25:1, from about 2:1 to about 20:1, from about 2:1 to about 15:1, from about 2:1 to about 10:1, from about 2:1 to about 8:1, from about 2:1 to about 6:1, from about 2:1 to about 5:1, from about 2:1 to about 4:1, from about 5:1 to about 50:1, from about 5:1 to about 40:1, from about 5:1 to about 30:1, from about 5:1 to about 25:1, from about 5:1 to about 20:1, from about 5:1 to about 15:1, from about 5:1 to about 10:1, from about 5:1 to about 8:1, from about 10:1 to about 40:1, from about 10:1 to about 30:1, from about 10:1 to about 25:1, from about 10:1 to about 20:1, from about 15:1 to about 40:1, from about 15:1 to about 30:1, from about 15:1 to about 25:1, or from about 15:1 to about 20:1.

The alkaline activator may comprise sodium hydroxide (NaOH), potassium hydroxide (KOH), sodium silicate ($Na_2SiO_3$), potassium silicate ($K_2SiO_3$), or combinations thereof. The alkaline activator may comprise metasilicate anhydrous (e.g., $Na_2SiO_3$, $K_2SiO_3$, etc.), caustic soda known as lye (NaOH), or combinations thereof.

In certain embodiments, the alkaline activator comprises NaOH, KOH, sodium silicate ($Na_2SiO_3$), and/or potassium silicate ($K_2SiO_3$), where NaOH, KOH, sodium silicate ($Na_2SiO_3$), or potassium silicate ($K_2SiO_3$) may be at a concentration ranging from about 2 to about 20 wt %, from about 3 to about 15 wt %, from about 4 to about 15 wt %, from about 5 to about 15 wt %, from about 5 to about 12 wt %, from about 5 to about 10 wt %, from about 2 to about 12 wt %, from about 3 to about 12 wt %, from about 4 to about 12 wt %, from about 3 to about 8 wt %, from about 6 to about 15 wt %, from about 6 to about 10 wt %, from about 4 to about 10 wt %, from about 3 to about 10 wt %, from about 5 to about 8 wt %, or from about 6 to about 12 wt %.

In certain embodiments, the alkaline activator is added to an inorganic waste composition to reach an initial concentration of NaOH, KOH, sodium silicate ($Na_2SiO_3$), or potassium silicate ($K_2SiO_3$) ranging from about 0.1 to about 2 wt %, from about 0.1 to about 1.5 wt %, from about 0.1 to about 1 wt %, from about 0.1 to about 0.9 wt %, from about 0.1 to about 0.8 wt %, from about 0.1 to about 0.7 wt %, from about 0.1 to about 0.6 wt %, from about 0.2 to about 0.9 wt %, from about 0.2 to about 0.8 wt %, from about 0.2 to about 0.7 wt %, from about 0.2 to 0.5 wt %, from about 0.1 to 0.5 wt %, or from about 0.2 to 0.6 wt %.

In certain embodiments, when the alkaline activator is added to an inorganic waste composition, the volume ratio of the inorganic waste composition to the alkaline activator may range from about 2:1 to about 200:1, from about 2:1 to about 180:1, from about 2:1 to about 150:1, from about 2:1 to about 120:1, from about 2:1 to about 100:1, from about 2:1 to about 80:1, from about 2:1 to about 50:1, from about 2:1 to about 40:1, from about 2:1 to about 30:1, from about 2:1 to about 20:1, from about 2:1 to about 15:1, from about 2:1 to about 10:1, from about 2:1 to about 8:1, from about 2:1 to about 6:1, from about 2:1 to about 5:1, from about 5:1 to about 200:1, from about 5:1 to about 150:1, from about 5:1 to about 120:1, from about 5:1 to about 100:1, from about 5:1 to about 80:1, from about 5:1 to about 50:1, from about 5:1 to about 40:1, from about 5:1 to about 30:1, from about 5:1 to about 25:1, from about 5:1 to about 20:1, from about 5:1 to about 15:1, from about 5:1 to about 10:1, from about 5:1 to about 8:1, from about 8:1 to about 200:1, from about 8:1 to about 150:1, from about 8:1 to about 120:1, from about 8:1 to about 100:1, from about 8:1 to about 80:1, from about 8:1 to about 50:1, from about 8:1 to about 40:1, from about 8:1 to about 30:1, from about 8:1 to about 25:1, from about 8:1 to about 20:1, from about 8:1 to about 15:1, from about 8:1 to about 10:1, from about 10:1 to about 200:1, from about 10:1 to about 150:1, from about 10:1 to about 120:1, from about 10:1 to about 100:1, from about 10:1 to about 80:1, from about 10:1 to about 50:1, from about 10:1 to about 40:1, from about 10:1 to about 30:1, from about 10:1 to about 25:1, from about 10:1 to about 20:1, from about 15:1 to about 200:1, from about 15:1 to about 150:1, from about 15:1 to about 120:1, from about 15:1 to about 100:1, from about 15:1 to about 80:1, from about 15:1 to about 50:1, from about 15:1 to about 40:1, from about 15:1 to about 30:1, from about 15:1 to about 25:1, from about 15:1 to about 20:1, from about 20:1 to about 200:1, from about 20:1 to about 150:1, from about 20:1 to about 120:1, from about 20:1 to about 100:1, from about 20:1 to about 80:1, from about 20:1 to about 50:1, from about 20:1 to about 40:1, from about 20:1 to about 30:1, from about 20:1 to about 25:1, from about 30:1 to about 200:1, from about 30:1 to about 150:1, from about 30:1 to about 120:1, from about 30:1 to about 100:1, from about 30:1 to about 80:1, from about 30:1 to about 50:1, from about 30:1 to about 40:1, from about 30:1 to about 35:1, from about 40:1 to about 200:1, from about 40:1 to about 150:1, from about 40:1 to about 120:1, from about 40:1 to about 100:1, from about 40:1 to about 80:1, from about 40:1 to about 50:1, from about 50:1 to about 200:1, from about 50:1 to about 150:1, from about 50:1 to about 120:1, from about 50:1 to about 100:1, from about 50:1 to about 80:1, or from about 50:1 to about 60:1.

In certain embodiments, when the alkaline activator is added to an inorganic waste composition, the volume ratio of the inorganic waste composition to the alkaline activator may range from about 10:0.5 to about 10:2, from about 10:0.5 to about 10:1.5, from about 10:0.6 to about 10:1.5, from about 10:0.7 to about 10:1.5, from about 10:0.8 to about 10:2, from about 10:0.8 to about 10:1.5, from about 10:0.8 to about 10:1.2, from about 10:0.5 to about 10:2, from about 10:0.9 to about 10:1.5, from about 10:0.9 to about 10:1.2, from about 10:0.6 to about 10:1.2, from about 10:0.9 to about 10:2, about 10:0.5, about 10:0.6, about 10:0.7, about 10:0.8, about 10:0.9, about 10:1, about 10:1.1, about 10:1.2, about 10:1.3, about 10:1.4, about 10:1.5, about 10:1.6, about 10:1.1.7, about 10:1.8, about 10:1.9, or about 10:2. In certain embodiments, the volume ratio of the inorganic waste to the alkaline activator may be from about 10:1 to about 10:1.2.

In one embodiment, sodium silicate ($Na_2SiO_3$) has the $SiO_2:Na_2O$ molar ratio ranging from 0.9:1 to 1.1:1.

The inorganic waste composition may comprise fly ash (FA), ground blast furnace slag (GBFS), red mud (RM), phosphogypsum (PG), rice husk ash (RHA), or combinations thereof.

In one embodiment, the inorganic waste composition may comprise about 40-50 wt % fly ash (FA), about 50-60 wt % ground blast furnace slag (GBFS), and about 4-8 wt % of silicate (e.g., sodium silicate, or metasilicate such as sodium metasilicate).

In one embodiment, the silicate may be sodium silicate or sodium metasilicate.

The organic waste composition may comprise municipal solid waste (MSW), animal waste, agricultural waste, green waste, mixed refuse, sewage sludge, or combinations thereof.

In the method, in step (c) (or step (b)), the biomaterial and the reactive zeolite gel (or the inorganic waste composition) may be mixed at a volume ratio ranging from about 5:1 to about 1:5.

In certain embodiments, the volume ratio of the reactive zeolite gel (or the inorganic reactive composition) to the biomaterial may range from about 1:10 to about 10:1, from about 1:5 to about 10:1, from about 1:2 to about 10:1, from about 1:1 to about 10:1, from about 2:3 to about 1:1, from about 1:1 to about 3:1, from about 1:1 to about 2:1, from about 1:1 to about 5:1, from about 1:2 to about 1:1, from about 1:5 to about 1:1, from about 1:3 to about 1:1, from about 1:4 to about 1:1, from about 1:3 to about 2:1, from about 1:3 to about 3:1, from about 1:2 to about 2:1, about 2:3 to about 3:2, about 1:1, about 3:2, or about 2:3. In certain embodiments, the volume ratio of the reactive zeolite gel (or the inorganic waste composition) to the biomaterial may be 40%: 60%.

In the method, in step (a), the hydrolyzing may be performed at a pH ranging from about pH 13 to about pH 14.

In the method, in step (a), the hydrolyzing may be performed at a temperature ranging from about 20° C. to about 25° C. The hydrolyzing may be performed at an ambient temperature.

In the method, in step (a), the hydrolyzing may be performed for about 8 hours to about 16 hours.

The activating of an inorganic waste composition (e.g., in step (b)) may be performed at a pH ranging from about pH13 to about pH14.

The activating of an inorganic waste composition (e.g., in step (b)) may be performed for about 10 minutes to about 24 hours, about 20 minutes to about 20 hours, about 30 minutes to about 15 hours, about 40 minutes to about 10 hours, about 10 minutes to about 10 hours, about 10 minutes to about 5 hours, about 10 minutes to about 4 hours, about 10 minutes to about 2 hours, about 10 minutes to about 1 hour, about 20 minutes to about 2 hours, about 20 minutes to about 1 hour, about 10 minutes to about 45 minutes, or about 25 minutes to about 45 minutes.

The activating of an inorganic waste composition (e.g., in step (b)) may be performed at a temperature ranging from about 20° C. to about 25° C. The activating may be performed at an ambient temperature.

In the method, the mixing (e.g., in step (c) or (b)) may be performed for about 2 hours to about 4 hours.

In the method, the mixing (e.g., in step (c) or (b)) may be performed at a temperature ranging from about 20° C. to about 25° C. The mixing may be performed at an ambient temperature.

The present disclosure provides for a method for producing a synthetic stone from wastes. The method may comprise: (a) activating an inorganic waste composition using an alkaline activator to produce a reactive zeolite gel; and curing the reactive zeolite gel to produce the synthetic stone.

The method may further comprise pouring the reactive zeolite gel into a mold.

Also encompassed by the present disclosure is a synthetic soil comprising about 4-6 wt % feldspar, about 4-6 wt % gypsum, and about 3-5 wt % maghemite. The synthetic soil may further comprise about 7-9 wt % goethite, and about 6-8 wt % hematite, about 4-6 wt % kaolinite, about 2-4 wt % gypsite, about 2-4 wt % calcite, and/or about 9-11 wt % quartz.

The synthetic soil may have a pH ranging from about pH 7 to about pH 10, from about pH 8 to about pH 9, from about pH 7 to about pH 9, from about pH 7 to about pH 8, or from about pH 8 to about pH 10.

The synthetic soil may further comprise about 25-30 wt % water, and about 25-30% (v/v) air. The water may be absorbed or part of a hydrate.

The synthetic soil may comprise about 15 wt % to about 35 wt % organic matter.

The synthetic soil may comprise about 8 wt % to about 20 wt % total carbon (C), or about 10 wt % to about 15 wt % total carbon (C).

The synthetic soil may comprise about 35-55 ppm lanthanum (La), and/or about 120-150 ppm cesium (Ce). The synthetic soil may comprise about 45 ppm lanthanum (La), and/or about 136 ppm cesium (Ce).

The synthetic soil may comprise about 55-75 ppm boron (B), about 15-30 ppm zinc (Zn), about 8-20 ppm copper (Cu), about 50-80 ppm cobalt (Co), and/or about 1-10 ppm molybdenum (Mo). The synthetic soil may comprise about 65 ppm boron (B), about 22 ppm zinc (Zn), about 12 ppm copper (Cu), about 67 ppm cobalt (Co), and/or about 5 ppm molybdenum (Mo).

The synthetic soil may comprise less than 5 ppm arsenic (As), less than 50 ppm copper (Cu), less than 60 ppm chromium (Cr), and/or less than 50 ppm zinc (Zn). The synthetic soil may comprise less than 2 ppm arsenic (As), less than 20 ppm copper (Cu), less than 40 ppm chromium (Cr), and/or less than 30 ppm zinc (Zn).

The synthetic soil may contain about 60 ppm to about 70 ppm boron (B). The synthetic soil may contain about 20 ppm to about 25 ppm zinc (Zn). The synthetic soil may contain about 10 ppm to about 15 ppm copper (Cu). The synthetic soil may contain about 60 ppm to about 75 ppm cobalt (Co). The synthetic soil may contain about 1 ppm to about 10 ppm molybdenum (Mo).

The synthetic soil may comprise less than 0.5 ppm cadmium (Cd), and/or less than 20 ppm lead (Pb). The synthetic soil may comprise less than 0.2 ppm cadmium (Cd), and/or less than 20 ppm lead (Pb).

The synthetic soil may have less than 5 wt % toxic heavy metals and metalloids.

The synthetic soil may comprise nutrients in a form of inorganic-organometallic complexes.

The present disclosure provides for a synthetic soil comprising about 15 wt % to about 35 wt % organic matter, about 15 wt % to about 25 wt % organic matter, or about 20 wt % organic matter.

Also encompassed by the present disclosure is a synthetic stone comprising (i) about 30-60 wt % quartz or quartzite, or about 30-60 wt % marble or limestone, and (ii) 30-60 wt % feldspar.

Also encompassed by the present disclosure is a clean and disinfected water body reclaimed after being decanted from the biogeochemical reactor. The water can be reused or further refined for various uses, including, but not limited to, watering lawns or golf courses, street washing, aquaculture or other industrial usages. The reclaimed water can help to reduce water shortage, such as in the desert or sea water contaminated area. The reclaimed water can also replenish the underground water aquifers with new water resources.

Also encompassed by the present disclosure is a clean air body regenerated after the odorous and/or toxic gases, such as methane ($CH_4$), hydrogen sulfide ($H_2S$) and ammonia ($NH_3$) which are sources of greenhouse gases, are purged, removed and finally sequestered, thus help to combat the climate change more effectively.

BRIEF DESCRIPTION OF THE DRAWINGS

Illustrative examples of the present disclosure are described in detail below with reference to the attached figures.

DETAILED DESCRIPTION

Figure 1:
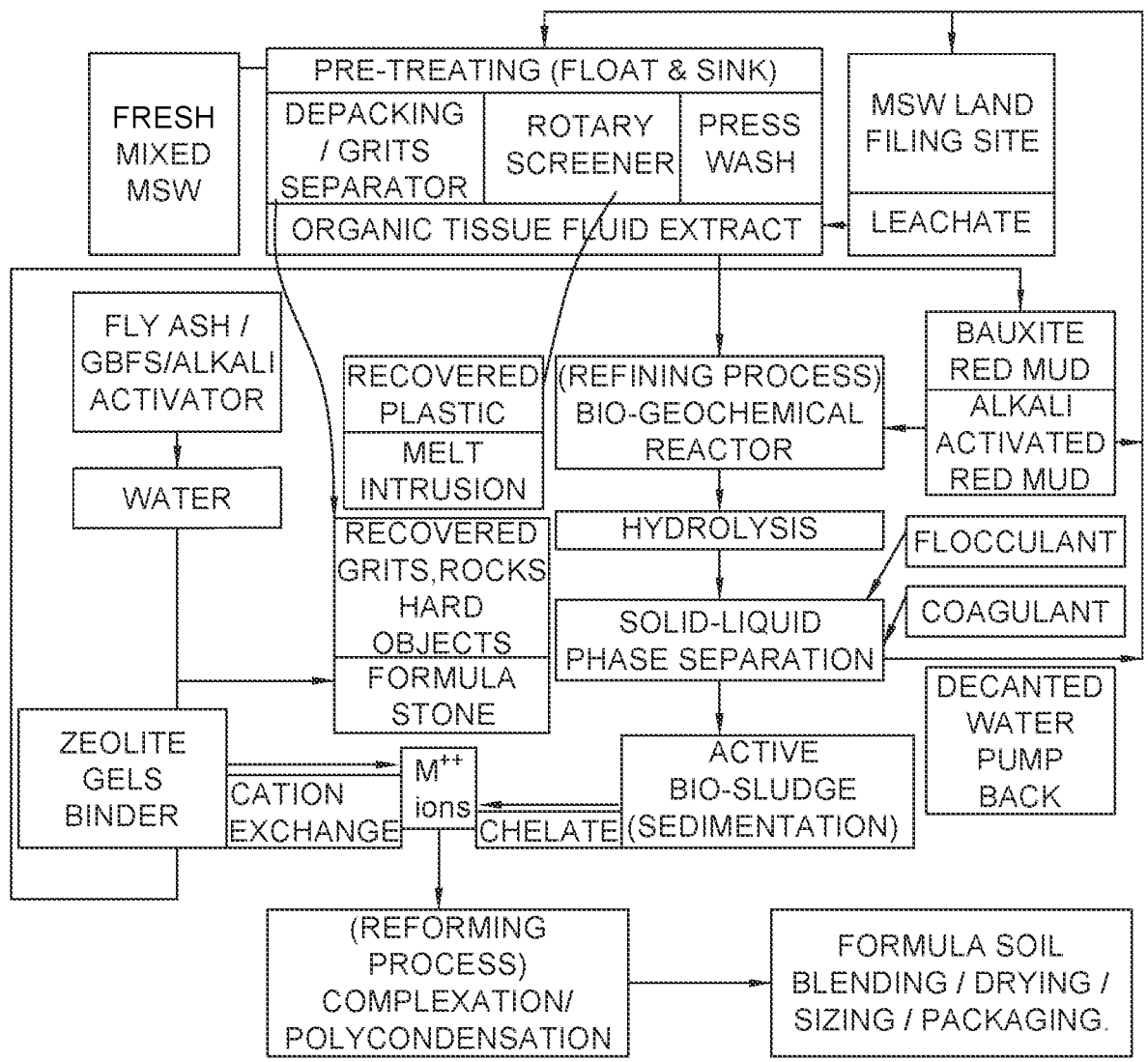
FIG. 1 shows the waste to soil process flow, conducted using a large-scale manufacturing system.
Figure 2:
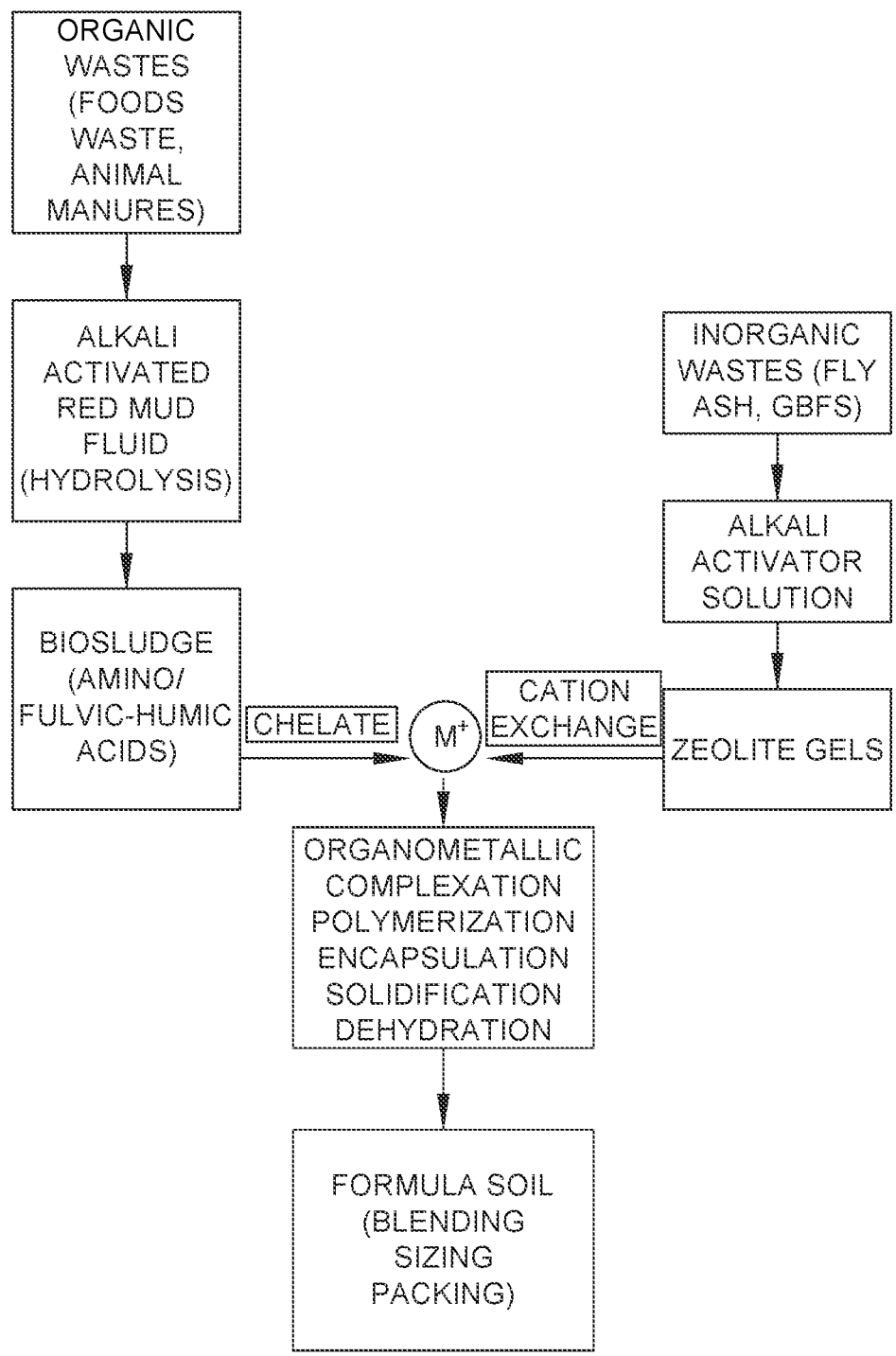
FIG. 2 shows the waste to soil process flow, conducted using a pilot-scale mobile manufacturing system.
Figure 3:
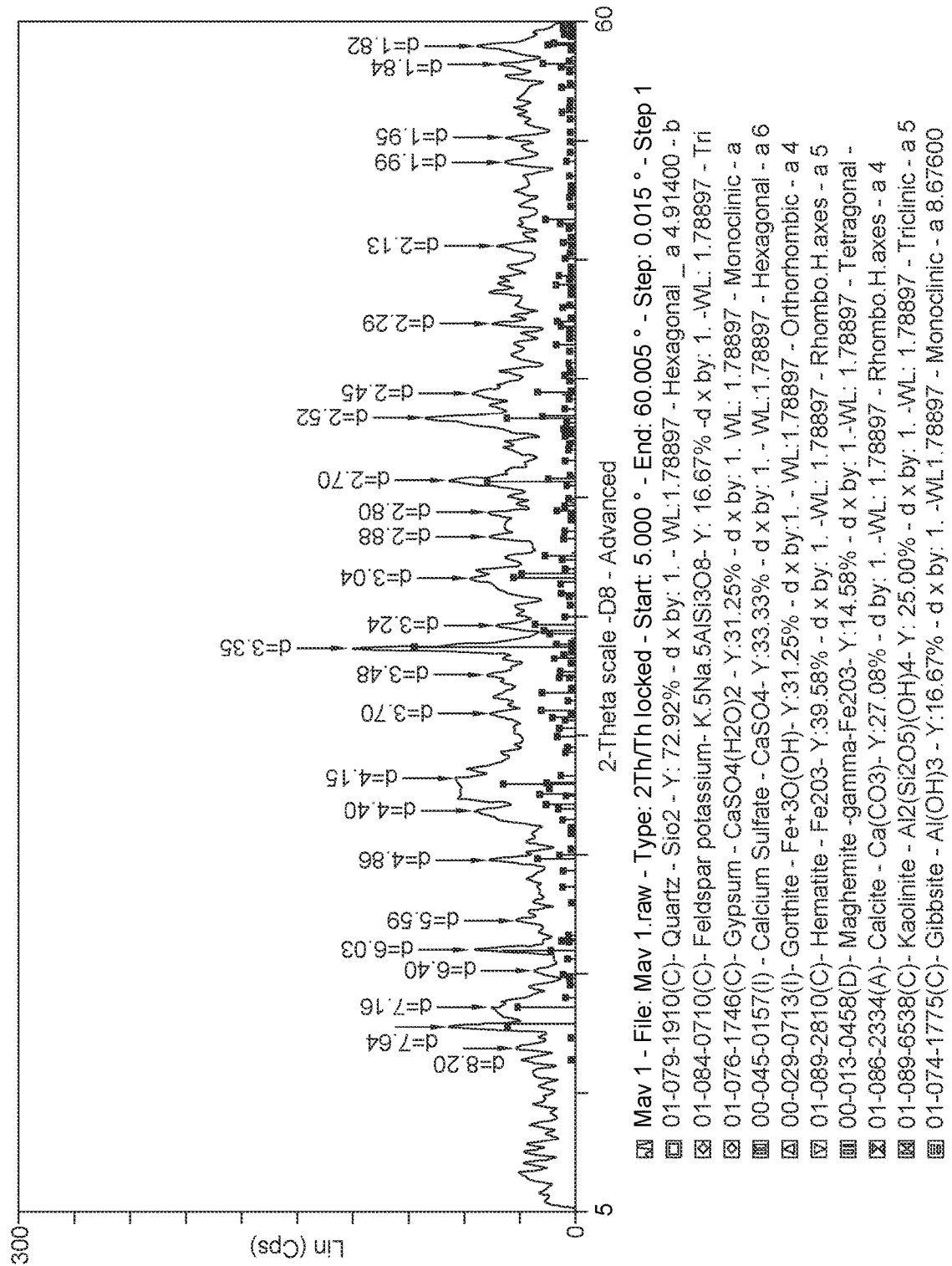
FIG. 3 is an X-ray diffraction pattern showing the mineral composition of the synthetic soil.
Figure 4:
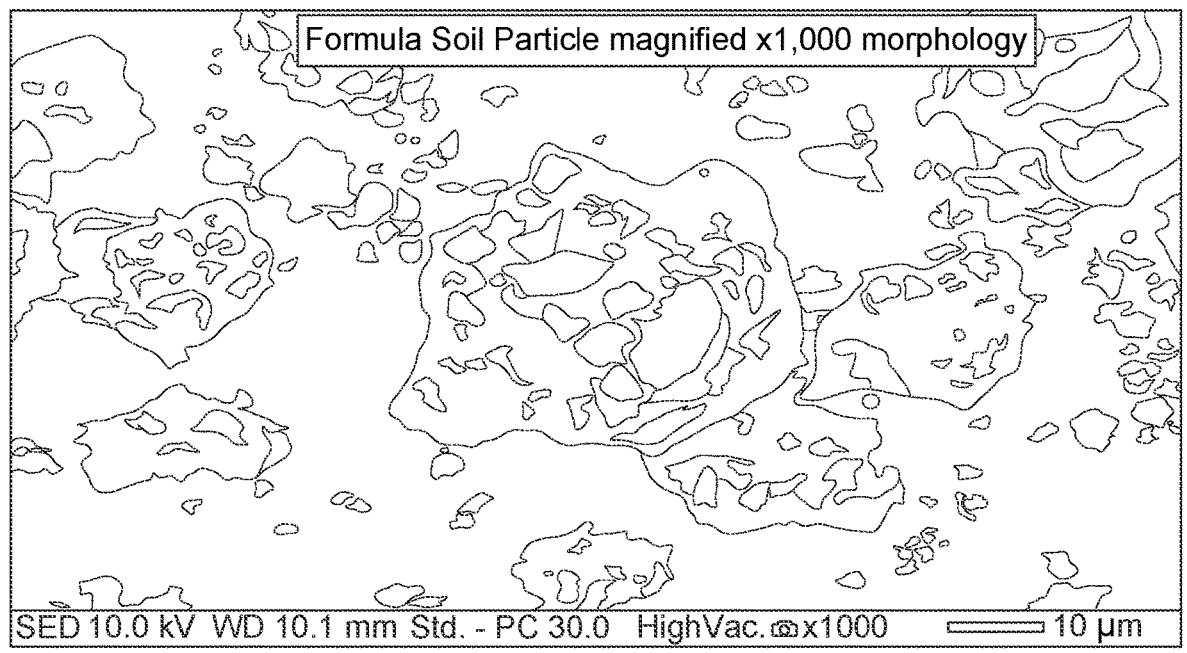
FIG. 4 is a scanning electron microscopic image of the synthetic soil particles.
Figure 5:
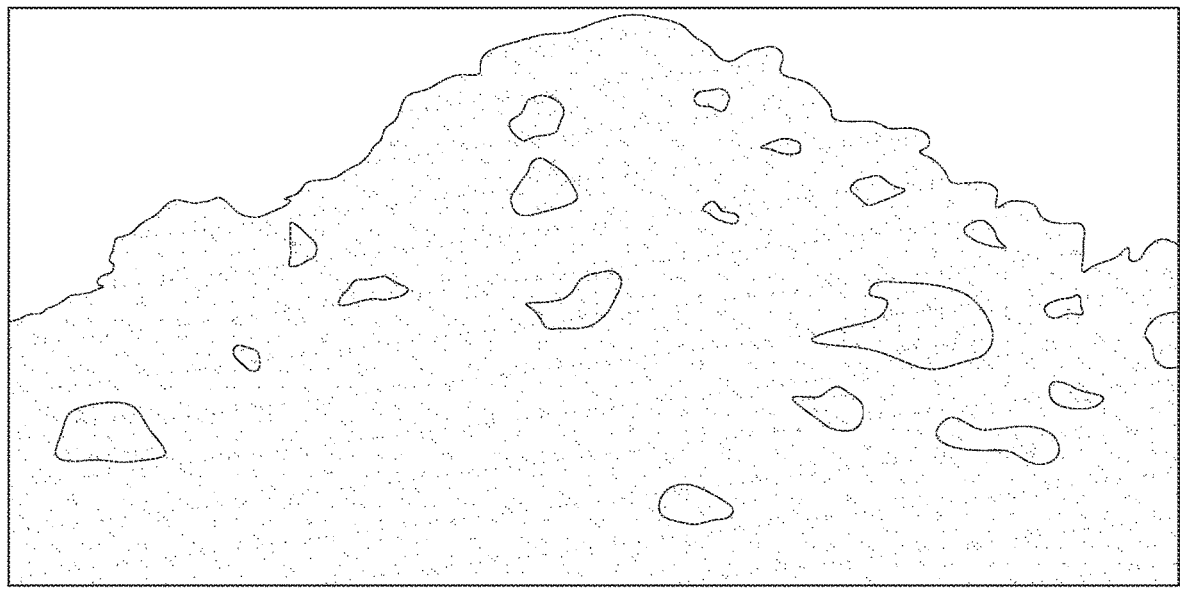
FIG. 5 is a photo of the synthetic soil (also called "Formula Soil" herein).
Figure 6:
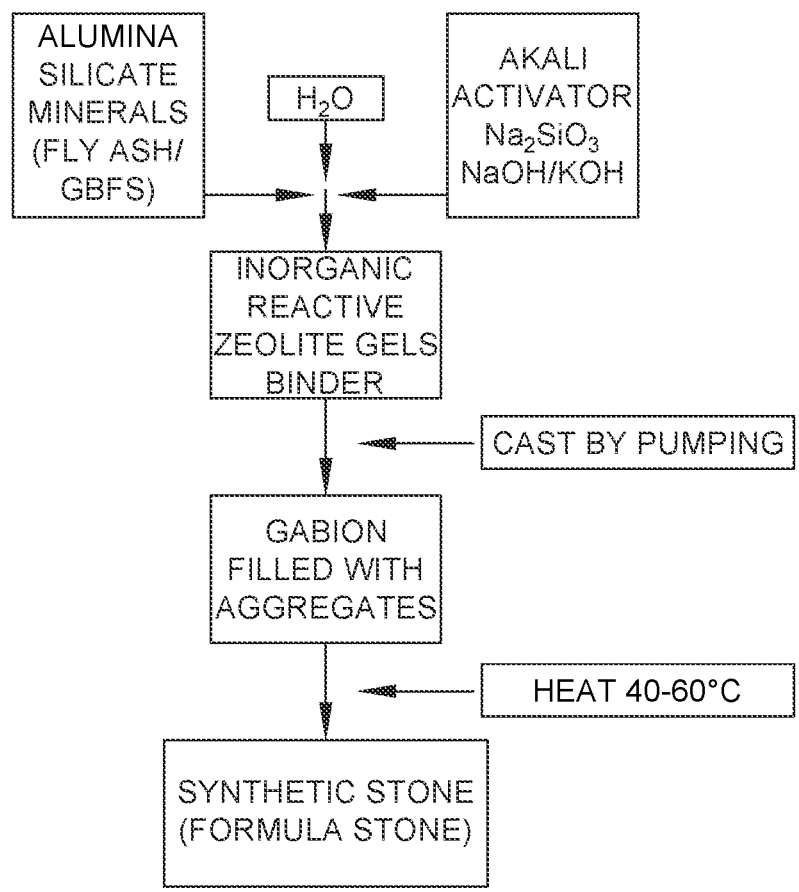
FIG. 6 shows the synthetic stone manufacturing process.
Figure 7:
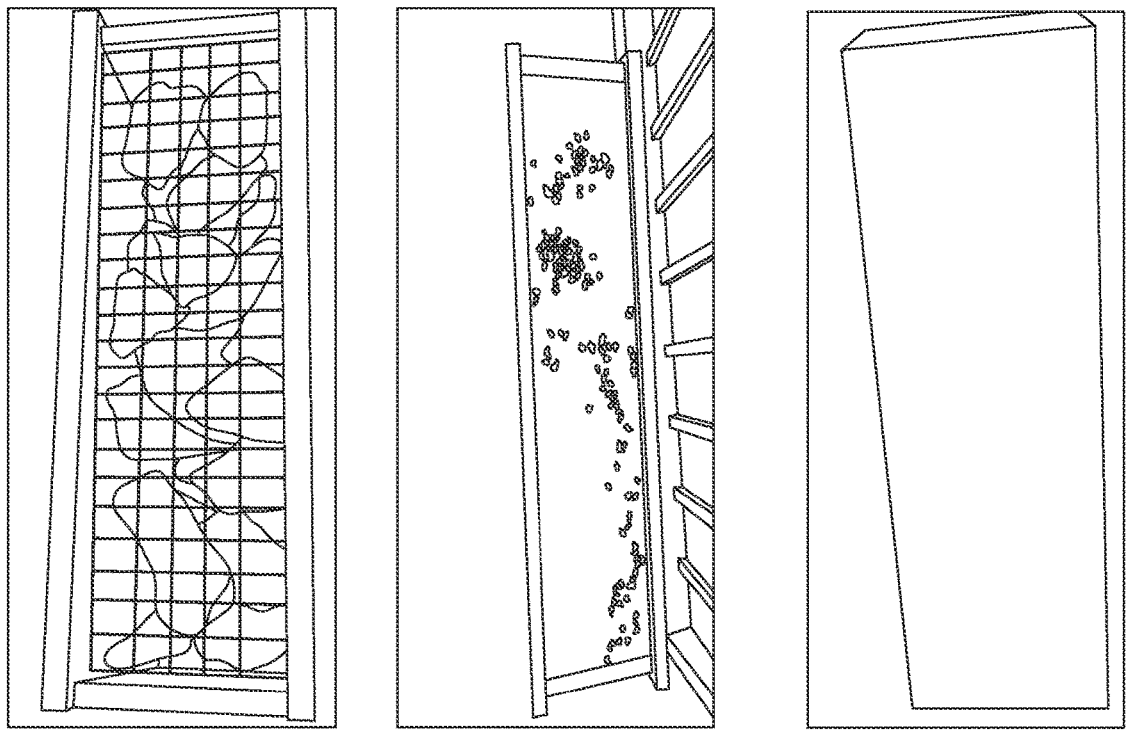
FIG. 7 shows an embodiment of the synthetic stone forming process.
Figure 7:
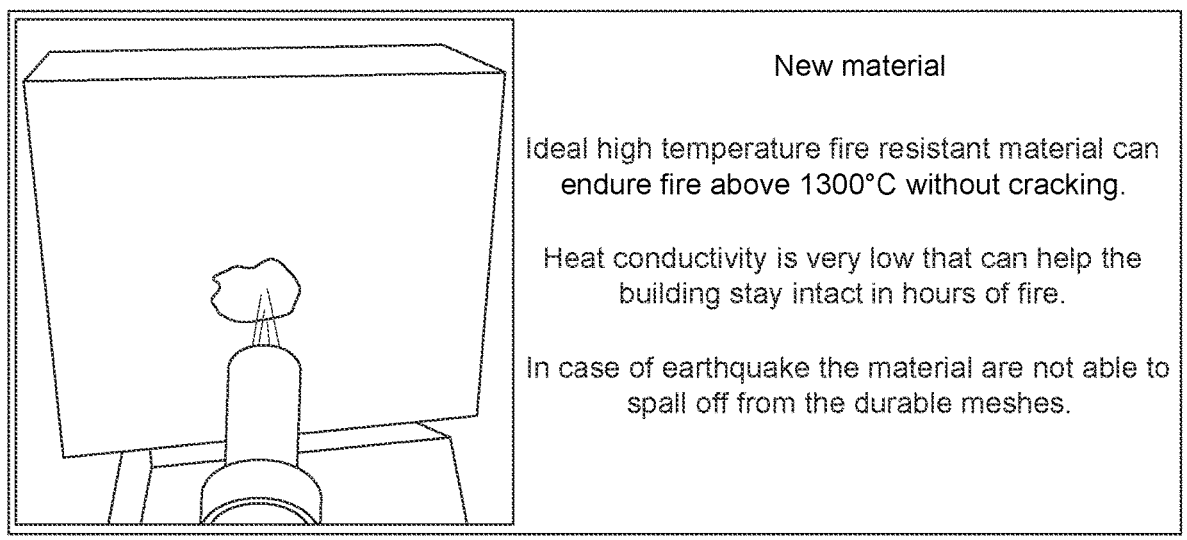

The present disclosure provides efficient and cost-effective methods for re-mining and converting waste into synthetic soil. The synthetic soil is generated from inorganic waste and organic waste through a hydrolysis-polycondensation process. Inorganic waste may include industrial waste such as fly ash (FA), red mud (RM), phosphogypsum (PG), and ground blast furnace slag (GBFS). Organic waste may comprise municipal solid waste (MSW), agricultural waste (such as agricultural compostable green), animal waste and sewage sludges. Organic waste can be hydrolyzed/extracted by, e.g., activated red mud, to form a biomaterial (e.g., a biosolid sludge), before being mixed with the activated inorganic waste (e.g., a reactive zeolite gel). The ingredients react, set and harden to form a synthetic soil, which is a new complex having geotechnical properties and nutritional values equal, or superior, to existing natural fertile soil. The synthetic soil is formed by a constructive process, unlike natural weathering which is a destructive process.

The present disclosure provides for a method for producing a synthetic soil from wastes.

In certain embodiments, the method may comprise: (a) hydrolyzing an organic waste composition using a hydrolyzing composition to produce a biomaterial; (b) activating an inorganic waste composition using an alkaline activator to produce a reactive zeolite gel; and (c) mixing the biomaterial with the reactive zeolite gel to produce the synthetic soil.

In certain embodiments, the method may comprise: (a) hydrolyzing an organic waste composition using a hydrolyzing composition to produce a biomaterial, and (b) mixing the biomaterial with an inorganic waste composition.

The hydrolyzing composition may have a pH ranging from about 8 to about 14, from about 8 to about 9, from about 9 to about 10, from about 10 to about 11, from about 11 to about 12, from about 12 to about 13, from about 8 to about 10, from about 10 to about 12, from about 12 to about 14, from about 8 to about 11, from about 11 to about 14, from about 8 to about 12, from about 9 to about 14, from about 10 to about 14, from about 11 to about 14, from about 12 to about 14, or from about 13 to about 14. The pH may be any one integer value pH selected from those including and between 8 and 14. The pH may be any pH including and between 8 and 14. The pH may be about 13 or about 14. In one embodiment, the hydrolyzing composition may have a pH ranging from about 13 to about 14.

The hydrolyzing composition may be activated red mud such as alkali-activated red mud.

Raw red mud is discharged in dry cakes or lumps, not ready for use in the soil manufacturing process and needs to be activated. In certain embodiments, the activation of raw red mud (RM) may involve grinding the cakes or lumps into particles smaller than about 5 mm. The particles may further be mixed with (i) water at a volume ratio ranging from about 40:60 to about 60:40, and (ii) one or more of the following: fly ash (FA) (e.g., at a volume ratio of 1:1), bottom ash (e.g., at a volume ratio of 1:1), ground blast furnace slags (GBFS) (e.g., at a volume ratio of 1:1), sodium silicate (e.g., sodium silicate is added to the red mud to reach an initial concentration of sodium silicate ranging from about 2 wt % to about 6 wt %, from about 3 wt % to about 6 wt %, from about 4 wt % to about 6 wt %, from about 3 wt % to about 5 wt %, from about 3 wt % to about 4 wt %, from about 2 wt % to about 5 wt %, from about 2 wt % to about 4 wt %, from about 2 wt % to about 3 wt %, or about 4 wt %), and sodium hydroxide (e.g., sodium hydroxide is added to the red mud to reach an initial concentration of sodium hydroxide ranging from about 2 wt % to about 6 wt %, from about 3 wt % to about 6 wt %, from about 4 wt % to about 6 wt %, from about 3 wt % to about 5 wt %, from about 3 wt % to about 4 wt %, from about 2 wt % to about 5 wt %, from about 2 wt % to about 4 wt %, from about 2 wt % to about 3 wt %, about 4 wt %, from about 1 wt % to about 2 wt %, about 1 wt %, or about 2 wt %). The alkali-activated red mud may have a basic pH (e.g., pH12-pH14 such as pH13-pH14 or pH14). In one embodiment, the alkali-activated red mud contains a mixture of RM, FA, GBFS, and sodium silicate (or sodium hydroxide).

The activation of the red mud may take place at an ambient temperature or at a temperature ranging from about 20° C. to about 25° C.

The activation of the red mud (e.g., the mixing) may be performed for about 10 minutes to about 24 hours, about 20 minutes to about 20 hours, about 30 minutes to about 15 hours, about 40 minutes to about 10 hours, about 10 minutes to about 10 hours, about 10 minutes to about 5 hours, about 10 minutes to about 4 hours, about 10 minutes to about 2 hours, about 10 minutes to about 1 hour, about 20 minutes to about 2 hours, about 20 minutes to about 1 hour, about 10 minutes to about 45 minutes, about 25 minutes to about 45 minutes, or from about 30 to 45 minutes.

The alkali-activated red mud may have a pH ranging from about 8 to about 14, from about 8 to about 9, from about 9 to about 10, from about 10 to about 11, from about 11 to about 12, from about 12 to about 13, from about 8 to about 10, from about 10 to about 12, from about 12 to about 14, from about 8 to about 11, from about 11 to about 14, from about 8 to about 12, from about 9 to about 14, from about 10 to about 14, from about 11 to about 14, from about 12 to about 14, or from about 13 to about 14. The pH may be any one integer value pH selected from those including and between 8 and 14. The pH may be any pH including and between 8 and 14. The pH may be about 13 or about 14.

The alkali-activated red mud (or activated red mud or ARM) may serve as a hydrolyzing catalyst, absorbent and binding agent.

The activated red mud can be used in the float and sink vessels for separating MSW and extracting organic fluid, absorbing heavy metals and metalloids, hydrolyzing organic waste, deodorizing and absorbing toxic gases and colloidal gels binder for agglomerating soil particles.

In certain embodiments, the hydrolyzing composition may comprise sodium hydroxide (NaOH), potassium hydroxide (KOH), sodium bicarbonate ($NaHCO_3$), sodium silicate ($Na_2SiO_3$), or combinations thereof. In certain embodiments, the hydrolyzing composition comprises activated red mud (ARM).

The hydrolyzing of the organic waste composition or hydrolysis step (e.g., step (a)) may be performed for about 8 to about 16 hours. Hydrolysis may be performed for a period of time ranging from about 2 hours to about 3 days, from about 4 hours to about 2 days, from about 6 hours to about 1 day, from about 4 hours to about 22 hours, from about 6 hours to about 20 hours, from about 8 hours to about 20 hours, from about 8 hours to about 16 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 1 day, about 2 days, or about 3 days. The time period may be any one integer value selected from those including and between value points, endpoints inclusive. The time period may be more than 3 days. The time period may be more than 4 days. The time period may be less than 1 day.

The hydrolyzing of the organic waste composition or hydrolysis step (e.g., step (a)) may be performed at a pH ranging from about pH13 to about pH14. Hydrolysis may be conducted at a pH ranging from about 8 to about 14, from about 8 to about 9, from about 9 to about 10, from about 10 to about 11, from about 11 to about 12, from about 12 to about 13, from about 8 to about 10, from about 10 to about 12, from about 12 to about 14, from about 8 to about 11, from about 11 to about 14, from about 8 to about 12, from about 9 to about 14, from about 10 to about 14, from about 11 to about 14, from about 12 to about 14, or from about 13 to about 14. The pH may be any one integer value pH selected from those including and between 8 and 14. The hydrolyzing or hydrolysis step (e.g., step (a)) may be performed at a pH including and between 8 and 14. The hydrolyzing or hydrolysis step (e.g., step (a)) may be performed at a pH about 13 or about 14.

In one embodiment, a hydrolyzing composition with a pH of about pH13 to about pH14 (e.g., pH14) is added to an organic waste composition until the pH of the mixture is about pH13 to about pH14 (e.g., pH14).

The biomaterial generated after hydrolysis of the organic waste composition may be an active biosolid sludge. The biomaterial may comprise amino acids (e.g., glycine, lysine, histidine, alanine, serine, proline, tyrosine, tryptophan, leucine, arginine, etc.), humic acid, fulvic acid, sugars, soap, cellulose, lignin, metallic ions, etc., or combinations thereof. In the mixing step (e.g., step (c)), the volume ratio of the biomaterial to the reactive zeolite gel may range from about 5:1 to 1:5, or about 2:3.

The hydrolyzing of the organic waste composition or hydrolysis step (e.g., step (a)) may be performed at a temperature ranging from about 20° C. to about 25° C., or at an ambient temperature. Hydrolysis may be conducted at a temperature ranging from about 4° C. to about 50° C., from about 4° C. to about 10° C., from about 10° C. to about 15° C., from about 15° C. to about 20° C., from about 20° C. to about 25° C., from about 25° C. to about 30° C., from about 30° C. to about 35° C., from about 4° C. to about 35° C., from about 4° C. to about 35° C. The temperature may be in a range between any two integer value temperatures selected from about 4° C. to about 50° C. The temperature may be any one integer value temperature selected from those including and between about 4° C. and about 50° C., or between about 15° C. and about 35° C. Temperatures between room temperature (ambient temperature) and about 50° C. may be used. The temperature may be any one temperature including and between room temperature and about 50° C. Temperatures between about 20° C. and about 35° C. may be used. The temperature may be any temperature including and between about 20° C. and about 25° C. The temperature may be about 25° C.

The biomaterial generated after hydrolysis of the organic waste composition may be an active biosolid sludge. The biomaterial may comprise amino acids (e.g., glycine, lysine, histidine, alanine, serine, proline, tyrosine, tryptophan, leucine, arginine, etc.), humic acid, fulvic acid, sugars, soap, cellulose, lignin, metallic ions, etc., or combinations thereof.

The alkaline activator may comprise sodium hydroxide (NaOH), potassium hydroxide (KOH), sodium silicate ($Na_2SiO_3$), potassium silicate ($K_2SiO_3$), or combinations thereof. The alkaline activator may comprise metasilicate anhydrous (e.g., $Na_2SiO_3$, $K_2SiO_3$, etc.), caustic soda known as lye (NaOH), or combinations thereof.

The alkaline activator may have a pH ranging from about 8 to about 14, from about 8 to about 9, from about 9 to about 10, from about 10 to about 11, from about 11 to about 12, from about 12 to about 13, from about 8 to about 10, from about 10 to about 12, from about 12 to about 14, from about 8 to about 11, from about 11 to about 14, from about 8 to about 12, from about 9 to about 14, from about 10 to about 14, from about 11 to about 14, from about 12 to about 14, or from about 13 to about 14. The pH may be any one integer value pH selected from those including and between 8 and 14. The pH may be any pH including and between 8 and 14. The pH may be about 13 or about 14. In one embodiment, the alkaline activator may have a pH ranging from about 13 to about 14. In one embodiment, the alkaline activator may have a pH of about 14.

The activating of the inorganic waste composition or activation step may be performed for about 8 to about 16 hours. Activating the inorganic waste composition may be performed for a period of time ranging from about 2 hours to about 3 days, from about 4 hours to about 2 days, from about 6 hours to about 1 day, from about 4 hours to about 22 hours, from about 6 hours to about 20 hours, from about 8 hours to about 20 hours, from about 8 hours to about 16 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 1 day, about 2 days, or about 3 days. The time period may be any one integer value selected from those including and between value points, endpoints inclusive. The time period may be more than 3 days. The time period may be more than 4 days. The time period may be less than 1 day.

The activating of the inorganic waste composition or activation step may be performed at a pH ranging from about pH13 to about pH14. Activating the inorganic waste composition may be conducted at a pH ranging from about 8 to about 14, from about 8 to about 9, from about 9 to about 10, from about 10 to about 11, from about 11 to about 12, from about 12 to about 13, from about 8 to about 10, from about 10 to about 12, from about 12 to about 14, from about 8 to about 11, from about 11 to about 14, from about 8 to about 12, from about 9 to about 14, from about 10 to about 14, from about 11 to about 14, from about 12 to about 14, or from about 13 to about 14. The pH may be any one integer value pH selected from those including and between 8 and 14. The activating of the inorganic waste composition or activation step may be performed at a pH including and between 8 and 14. The activating of the inorganic waste composition or activation step may be performed at a pH about 13 or about 14.

The activating of the inorganic waste composition or activation step may be performed at a temperature ranging from about 20° C. to about 25° C., or at an ambient temperature. Activating the inorganic waste composition may be conducted at a temperature ranging from about 4° C. to about 50° C., from about 4° C. to about 10° C., from about 10° C. to about 15° C., from about 15° C. to about 20° C., from about 20° C. to about 25° C., from about 25° C. to about 30° C., from about 30° C. to about 35° C., from about 4° C. to about 35° C., from about 4° C. to about 35° C. The temperature may be in a range between any two integer value temperatures selected from about 4° C. to about 50° C. The temperature may be any one integer value temperature selected from those including and between about 4° C. and about 50° C., or between about 15° C. and about 35° C. Temperatures between room temperature (ambient temperature) and about 50° C. may be used. The temperature may be any one temperature including and between room temperature and about 50° C. Temperatures between about 20° C. and about 35° C. may be used. The temperature may be any temperature including and between about 20° C. and about 25° C. The temperature may be about 25° C.

The hydrolyzing composition and the alkaline activator may be different compositions, or may be the same composition.

In certain embodiments, in the mixing step (e.g., step (c)), the volume ratio of the biomaterial to the reactive zeolite gel (or the inorganic waste composition) may range from about 1:10 to about 10:1, from about 1:5 to about 10:1, from about 1:5 to about 5:1, from about 1:2 to about 10:1, from about 1:1 to about 10:1, from about 2:3 to about 1:1, from about 1:1 to about 3:1, from about 1:1 to about 2:1, from about 1:1 to about 5:1, from about 1:2 to about 1:1, from about 1:5 to about 1:1, from about 1:3 to about 1:1, from about 1:4 to about 1:1, from about 1:3 to about 2:1, from about 1:3 to about 3:1, from about 1:2 to about 2:1, about 5:1, about 4:1, about 3:1, about 2:1, about 1:1, about 1:2, about 1:3, about 1:4, about 1:5, about 3:2, or about 2:3. In certain embodiments, the volume ratio of the inorganic portion (e.g., the reactive zeolite gel or the inorganic waste composition) to the organic portion (e.g., biomaterial) may be 40%: 60% or 60%: 40%.

In the mixing step (e.g., step (c)), the volume ratio of the biomaterial to the reactive zeolite gel (or the inorganic waste composition) may range from about 5:1 to 1:5, about 3:2, or about 2:3.

Without wishing to be bound by any theory, it is believed that in certain embodiments, the inorganic waste composition quickly dissolves after reacting with NaOH in the activated red mud to form a zeolite gel. Subsequently, a series of biogeochemical reactions take place, such as ion-exchange and chelation, freeing water for gelation, reorganization and finally polymerization and hardening, to form the synthetic soil. Fly ash, ground blast furnace slag and red mud are mixed (e.g., in any ratio), a heavy clay embodiment formed, aggregated, solidified as clay stone.

The synthetic soil may be further admixed with one or more fillers. Fillers may be used to reduce pH, increase porosity and/or water absorption/desorption capacity of the synthetic soil. Non-limiting examples of fillers include phosphogypsum, biochar, (grounded) coconut fiber, peanut shell, and combinations thereof.

The mixture may be dried to form the synthetic soil. To shorten the drying process, phosphogypsum (e.g., about 5 wt % to about 15 wt %, or about 10 wt %), biochar (e.g., about 1 wt % to about 10 wt %, or about 5 wt %) and ground peanut shell (e.g., about 1 wt % to about 10 wt %, or about 5 wt %) may be added.

The method may comprise a step of sizing the waste, for example by crushing, grinding or chopping solid waste to provide suitable sized pieces. Suitable sized pieces may be less than 200 mm, less than 150 mm, less than 100 mm, less than 50 mm or less than 20 mm sized pieces.

The method may comprise one hydrolysis step, two hydrolysis steps, three hydrolysis steps, or more than three hydrolysis steps. The hydrolysis steps may be performed sequentially. For example, the method may comprise a base hydrolysis step.

The method may further comprise a step of adding nutrients or minerals (for example magnesium salts) to the synthetic soil to confer a suitable balance of nutrients. Nutrients or minerals may be selected in order to complement the known components of the synthetic soil to provide nutrients or minerals that are known to be lacking in the synthetic soil. Nutrients or minerals may be selected to address a deficiency in the area where the synthetic soil will be used.

The method may further comprise a step of adding ammonia and/or other basic or carbonate materials to increase the content of nitrogen or other minerals in the synthetic soil. For example, ammonia and/or other minerals may be added to the reaction mixture or the synthetic soil at any point in the processing in order to increase the nitrogen content, the phosphate content and/or the potassium content of the synthetic soil. Ammonia and/or other minerals may be added to the reaction mixture or the synthetic soil at any point in the processing in order to produce the synthetic soil with a particular balance of nitrogen, phosphate and potassium (NPK content) that is suitable for a specific soil type and/or crop type.

The method may comprise the step of drying the synthetic soil. This may be done by a combination of heating and the addition of a dehydrating granulating mixture followed by further heating in the granule drying stage of the process. In one embodiment, the mixture may be dried until it comprises about 20-40%, about 25-35%, or about 25-30% moisture. The water may be chemical (e.g., forming part of a hydrate) or absorbed water.

The present disclosure provides for a method for producing a synthetic soil from wastes. The method may comprise: (a) hydrolyzing an organic waste composition using a hydrolyzing composition to produce a biomaterial and extracting it from the solution; (b) activating an inorganic waste composition using an alkaline activator to produce a reactive zeolite gel; and (c) mixing the biomaterial with the reactive zeolite gel to produce the synthetic soil.

In certain embodiments, when the biomaterial is mixed with the reactive zeolite gel, the synthetic soil may be reformed by absorption, chelation, complexation, polymerization, encapsulation, stabilization and solidification.

In certain embodiments, feldspars, rock building minerals form exogenously when zeolites poly-condenses, serving as a binder for synthetic rock and soil reforming which are not found in natural soil formed by weathering process from the bed rocks.

The reactive zeolite gel may be used as a binder and/or absorbent for the formation of the synthetic soil and/or synthetic stone.

In certain embodiments, the reactive zeolite gel may be polymerized, cured, hardened to bind the biomaterial to produce the synthetic soil.

In certain embodiments, the reactive zeolite gel may be polymerized, cured, solidified, hardened to bind all unreacted inorganic material such as rock fragments, pebble, gravel, metal chip to form the synthetic stone.

The specific conditions where the synthetic soil will be used may be considered when selecting the composition of the synthetic soil (e.g., how to enrich the synthetic soil). The specific conditions may be the pH of the soil, the expected rainfall, the type of crop, the nutrient requirements of the crop, the nutrient profile of the soil, the ambient temperature that the crop will grow at, the length of growing time of the crop and/or the rate at which the crop requires nutrients during particular phases of its growth.

The method may comprise the step of adding one or more minerals to provide suitable nutrients in the synthetic soil.

The method may comprise the step of adding one or more bio-fungicides to provide antifungal properties to the synthetic soil.

The method may comprise the step of adding one or more bio-pesticides to provide pesticide properties to the synthetic soil.

The method may comprise the step of adding one or more bio-herbicides to provide herbicide properties to the synthetic soil.

The method may comprise the step of adding one or more unpalatable compounds to deter animals from eating the synthetic soil.

The method may comprise the step of processing the synthetic soil, for example, by pelleting, granulating, press-forming or powdering the synthetic soil.

The method may comprise the step of coating the synthetic soil, for example, coating pellets or granules of the fertilizer, with a coating comprising one or more bacteria, fungal spores, fungicides, pesticides, herbicides, pest control agents, and/or one or more unpalatable compounds.

The method may further comprise a packaging step where the synthetic soil is packaged.

The method may be carried out in a facility or plant. The method may be carried out in a suitable apparatus comprising one or more vessels. The one or more vessels may be equipped with a mechanism for lifting the mixture upwards in a central region of the vessel by means of a lifting mechanism. The vessels may also be equipped with a heating mechanism to heat the contents of the vessel.

The apparatus may comprise a crusher operative to crush the raw waste into pieces below a predetermined size.

The apparatus may further comprise a packaging unit or bagging machine operative to receive and package or bag the synthetic soil.

Water may be added to the waste before or after sizing the waste.

A product sizing apparatus may be provided operative to resize the product into pieces below a predetermined size.

The apparatus may comprise a dryer operative to receive and dry the product.

The present disclosure provides for a system for producing synthetic soil from wastes. The system may comprise: (a) a hydrolyzing device for hydrolyzing an organic waste composition using a hydrolyzing composition to produce a biomaterial; (b) an activating device for activating an inorganic waste composition using an alkaline activator to produce a reactive zeolite gel; and (c) a mixing device for mixing the biomaterial with the reactive zeolite gel.

Besides generating synthetic soil from waste, the present methods may also produce synthetic stones (also referred to as "formula stones" herein).

The present disclosure provides for a method for producing a synthetic stone from wastes. The method may comprise: (a) activating an inorganic waste composition using an alkaline activator to produce a reactive zeolite gel; (b) curing the reactive zeolite gel to produce the synthetic stone.

The method may further comprise pouring the reactive zeolite gel into a mold.

Synthetic stones are intermediate products generated if an activated inorganic waste (e.g., a reactive zeolite gel) (alone or further mixed with aggregates) is let to cure (e.g., self-cure at ambient conditions). The curing process may be without addition of water and/or without any means to block the evaporation. The aggregates may comprise quartz sands, gravels, pebbles, rock fragments of any size, brick blocks, concrete rubbles, HDPE (high-density polyethylene), PVC (polyvinyl chloride) chips, metal (e.g., scrap metal), steel, mineral fibers, broken or used glass bottles, broken glass, oyster shells etc., or combinations thereof.

The curing may be for a period of time ranging from about 2 hours to about 24 hours, or about 8 hours to about 36 hours, or about 1 day to about 7 days. The curing period may range from about 3 hours to about 3 days, from about 4 hours to about 2 days, from about 6 hours to about 1 day, from about 4 hours to about 22 hours, from about 6 hours to about 20 hours, from about 8 hours to about 20 hours, from about 8 hours to about 16 hours, from about 16 hours to about 24 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 1 day, about 2 days, about 3 days, about 4 days, about 5 days, or about 6 days. The time period may be any one integer value selected from those including and between value points, endpoints inclusive. The time period may be more than 6 days. The time period may be more than 7 days. The time period may be less than 1 day.

In certain embodiments, one or more additives that can decrease/block evaporation may be added. The additive may have hydraulic latent heat properties and can absorb water and generate heat, accelerating the curing and hardening process in a desired length of time. In one embodiment, the curing time period is shortened by microwave energy (e.g., about 600 W to about 1000 W), to about 3 minutes to about 6 minutes.

The method may further comprise pouring the reactive zeolite gel into a mold to form a synthetic stone. In one embodiment, the reactive zeolite gel is cast into a gabion. The gabion may be a wirework container or big cage made by steel woven mesh or welded steel wires filled with rock, broken concrete or other material, used primarily in construction of dams, retaining walls, slopes and streambanks etc., to protect them from moving water. The reactive zeolite gel can fill the voids, self-compacts, reacts, and encapsulates filler materials cementing them together. The reactive zeolite gel then cures and hardens to form a synthetic conglomerate of any desired shape and size.

The synthetic stone may have superior mechanical/engineering properties, such as fire resistance (e.g., up to 1300° C.), chemical resistance to acids, alkali and marine environments, and/or super earthquake-resistance (e.g., with compressive strength up to 550 Mpa). The synthetic stone may have engineering properties superior to natural cut stone or artificial stone and concrete blocks. The synthetic stone may be used for various applications, including construction, infrastructure projects, replacing natural cut stone and ordinary Portland cement (OPC) concrete for various purposes, such as landscaping, supersized art works, construction of underground tunnels, self-floating houses, sea dikes, river embankment, soil retaining dams, water treatment plants, mold for hot melt metal casting, castable refractory material, etc.

In one embodiment, the reactive zeolite gel may be used as fire-resistant paint or chemical resistant for coating the concrete or brick, floor and super bonding plaster for tiles, stone blocks . . . etc.

In one embodiment, the reactive zeolite gel may be used as heat-set cement for closing up an abandoned oil.

In one embodiment, the reactive zeolite gel may be used for casting stone like statues, artifacts or preparing mold for hot melt metal casting.

In one embodiment, the reactive zeolite gel may be used for casting the liners directly to the furnace or chimney to replace refractory brick.

In one embodiment, the reactive zeolite gel may be used as an ink for 3D printing by adjusting the fluid viscosity and setting time.

The present methods may comprise one or more of the following technologies: float and sink for mineral and ore processing; waste water treatment and reclamation, biogeo-chemical processing (e.g., alkaline hydrolysis of fly ash and/or organic waste composition for waste treatment); Solidification/Stabilization (S/S) Technology for solidification and stabilization of toxic wastes; absorption technologies of heavy metals and metalloids and reforming of wastes to soil and stone; and chelation technology for hydroponic fertilizer manufacturing, and inoculation of nitrogen fixing bacteria.

The present synthetic soil can be used for organic farming, landscaping, desertized land reclamation and reforestation.

The present methods provide a multipurpose synthetic soil (also referred to herein as "formula soil") that can be used in organic farming, landscaping, desertized land reclamation and reforestation. The synthetic soil can be a clean and disinfected growth medium (e.g., substantially free of pathogens, vectors, heavy metals and metalloids, and/or weed seeds). It can serve as a multipurpose soil conditioner that can, e.g., amend acidic and/or saline soils, as well as absorb heavy metals and metalloids from contaminated soils. The present synthetic soil may be an intelligent nutrient supplier to sufficiently supply plants with necessary nutrients. The synthetic soil can be a passive agro-pharmaceuticals (as pathogens and weed seeds etc. have been destroyed during the formation of the synthetic soil). The synthetic soil may act as a moisture-retaining agent to capture and retain water and nutrients. The present synthetic soil may release nutrients to plants over a period of time, for example several months. This means that there is less danger of toxicity to plants and of nutrients running off the land before they are taken up by plants. The present synthetic soil may provide a sustained supply of nutrients through a longer period of the growing season. The synthetic soil can also be a perfect matrix for inoculating diazotrophic bacteria (e.g., rhizobia).

The present synthetic soil exhibits properties essential for growth of plants. It has a porous structure and exhibits air permeability, heat insulating, water retention, and nutrient retention. Furthermore, having been treated in an alkaline composition, the synthetic soil contains substantially no phytopathogenic bacteria or eggs of noxious insects and thus protects plants from diseases or noxious insects.

In certain embodiments, organic and inorganic wastes are used to produce a heterogeneous polymerized zeolite-encapsulated organometallic complex structures. Soil particles may be bound together by a colloidal force to provide excellent nutrient and water retaining capabilities.

In another aspect, the present synthetic soil provides one or more of the following: nourishing the soil in a natural manner, providing a balanced release (e.g., slow and fast release) of nutrients, establishing improved water retention of the soil, improving soil porosity, delivering deeper root penetration of nutrients, or combinations thereof.

The present synthetic soil can be useful as, for example, an additive to other products. Similarly, the present synthetic soil can be added or spread onto fields or crops. The present synthetic soil can be incorporated into other agricultural compositions. In a further aspect, the present synthetic soil can be useful for lawn and garden uses. In still further aspects, the present synthetic soil can be used in turf management applications. In still further aspects, the present synthetic soil can be retail packaged for use by consumers. In an even further aspect, the present synthetic soil can be used in professional activities, for example, in horticulture-related activities.

The present synthetic soil provides excellent greenhouse gas (GHG) sequestration. A substantial portion (e.g., substantially all) of organic matter in the waste may be solidified and stabilized in the synthetic soil (e.g., in the structure of the soil's feldspar encapsulated organometallic complex). The present synthetic soil can substitute for synthetic fertilizer or natural manure which are decomposed by microbes to generate powerful GHG such as nitrous oxide ($N_2O$), a major contributor to global warming.

Besides synthetic soil, the present disclosure also provides other synthetic materials such as synthetic stones (or formula stones). The present methods/systems recover sizable quantities of waste plastics for commercial uses without incurring the secondary emission.

The present synthetic soil helps circumvent the usage of chemical fertilizers, vermicompost, insecticides, herbicides and limes, while helping reduce water consumption by at least 50%. Thus, farmers' production costs can be reduced by at least 40%. In addition, the produce can be certified as organic and is safer to consume.

Waste is used as raw materials for producing the present synthetic soil. Landfill sites may be a mineral deposit which can be re-mined. Environmental benefits of the present methods and synthetic soil include lessening the need for landfill and waste incineration, as well as restoring water, soil and landscape to conditions meeting environmental protection standards.

The present method to produce soil from waste may be performed for a period of time ranging from about 3 hours to about 3 days, from about 4 hours to about 2 days, from about 6 hours to about 1 day, from about 4 hours to about 22 hours, from about 6 hours to about 20 hours, from about 8 hours to about 20 hours, from about 8 hours to about 16 hours, from about 16 hours to about 24 hours, about 2 hours, about 3 hours, about 4 hours, about 5 hours, about 6 hours, about 7 hours, about 8 hours, about 9 hours, about 10 hours, about 11 hours, about 12 hours, about 13 hours, about 14 hours, about 15 hours, about 16 hours, about 17 hours, about 18 hours, about 19 hours, about 20 hours, about 21 hours, about 22 hours, about 23 hours, about 1 day, about 2 days, or about 3 days. The time period may be any one integer value selected from those including and between value points, endpoints inclusive. The time period may be more than 3 days. The time period may be more than 4 days. The time period may be less than 1 day.

A significant percentage of heavy metals (e.g., about 90-95%) are absorbed/chelated, making the synthetic soil safe to plants and beneficial microorganisms. Alkaline hydrolysis kills a significant percentage (e.g., greater than or about 80%, greater than or about 85%, greater than or about 90%, greater than or about 95%, or greater than or about 99%) of pathogens, parasites, vectors and weed seeds in the waste, the starting material.

The synthetic soil may be designed and tailor-made to meet specific requirements. The synthetic soil may be enriched. In certain embodiments, the present synthetic soil may be enriched with organic matter (e.g., 20 wt % or other weight percentages as described herein), special micronutrients (such as 65 ppm of boron (B)), rare earth elements (such as 48 ppm of lanthanum (La) and 136 ppm of cesium (Ce)). The synthetic soil promotes healthy growth for plants, disease resistance and drought tolerance.

The synthetic soil can be inoculated with diazotrophic microorganisms (such as bacteria and archaea) that fix atmospheric nitrogen into a more usable form such as ammonia. Examples of diazotrophic microorganisms include *rhizobia, Frankia* and *Azospirillum* (such as *Klebsiella pneumoniae* and *Azotobacter vinelandii*). All diazotrophs contain iron-molybdenum or -vanadium nitrogenase systems.

The synthetic soil may have a pH between about pH 7 and about pH 10, between about pH 7 and about pH 9, or between about pH 8 and about pH 9. The pH of the synthetic soil may be any one integer value pH selected from those including and between about pH 5 and about pH 11. The pH of the synthetic soil may be any pH including and between about pH 6 and about pH 9. The pH of the synthetic soil may be about pH 8.5. The synthetic soil may have a pH between about pH 5 and about pH 9. The synthetic soil may have a pH between about pH 3 and about pH 7, between about pH 4 and about pH 7, between about pH 2 and about pH 6, between about pH 3 and about pH 6, between about pH 4 and about pH 6.5, or between about pH 4 and about pH 5.

The synthetic soil may comprise organic matter ranging from about 8 wt % to about 40 wt %, from about 10 wt % to about 35 wt %, from about 10 wt % to about 30 wt %, from about 10 wt % to about 25 wt %, from about 8 wt % to about 35 wt %, from about 8 wt % to about 30 wt %, from about 8 wt % to about 25 wt %, from about 15 wt % to about 25 wt %, from about 20 wt % to about 30 wt %, or from about 20 wt % to about 25 wt %.

The synthetic soil may comprise total carbon (C) ranging from about 5 wt % to about 30 wt %, from about 5 wt % to about 25 wt %, from about 5 wt % to about 20 wt %, from about 8 wt % to about 25 wt %, from about 8 wt % to about 20 wt %, from about 8 wt % to about 15 wt %, from about 10 wt % to about 15 wt %, from about 5 wt % to about 15 wt %, from about 10 wt % to about 13 wt %, or from about 8 wt % to about 13 wt %.

The synthetic soil may comprise total nitrogen (N) ranging from about 0.45 wt % to about 2.7 wt %, from about 0.45 wt % to about 1.2 wt %, from about 0.45 wt % to about 1.8 wt %, from about 0.7 wt % to about 2.2 wt %, from about 0.7 wt % to about 1.8 wt %, from about 0.7 wt % to about 1.3 wt %, from about 0.9 wt % to about 1.3 wt %, from about 0.4 wt % to about 1.4 wt %, from about 0.9 wt % to 1.2 wt %, or about 0.7 wt % to about 1.2 wt %.

The synthetic soil may comprise less than 10 ppm, less than 9 ppm, less than 8 ppm, less than 7 ppm, less than 6 ppm, less than 5 ppm, less than 4 ppm, less than 3 ppm, less than 2 ppm, or less than 1 ppm, arsenic (As).

The synthetic soil may comprise less than 70 ppm, less than 60 ppm, less than 50 ppm, less than 40 ppm, less than 30 ppm, less than 20 ppm, less than 18 ppm, less than 16 ppm, less than 15 ppm, or less than 13 ppm, copper (Cu).

The synthetic soil may comprise less than 100 ppm, less than 90 ppm, less than 80 ppm, less than 70 ppm, less than 60 ppm, less than 50 ppm, less than 40 ppm, less than 75 ppm, less than 65 ppm, less than 55 ppm, less than 45 ppm, less than 35 ppm, or less than 32 ppm, chromium (Cr).

The synthetic soil may comprise less than 150 ppm, less than 130 ppm, less than 120 ppm, less than 110 ppm, less than 100 ppm, less than 90 ppm, less than 80 ppm, less than 70 ppm, less than 60 ppm, less than 50 ppm, less than 40 ppm, less than 30 ppm, less than 75 ppm, less than 65 ppm, less than 55 ppm, less than 45 ppm, less than 35 ppm, or less than 25 ppm, zinc (Zn).

The synthetic soil may comprise less than 1.2 ppm, less than 1.1 ppm, less than 1 ppm, less than 0.9 ppm, less than 0.8 ppm, less than 0.7 ppm, less than 0.6 ppm, less than 0.5 ppm, less than 0.4 ppm, less than 0.3 ppm, less than 0.2 ppm, or less than 0.1 ppm, cadmium (Cd). In one embodiment, the synthetic soil is substantially free of cadmium (Cd). In one embodiment, cadmium (Cd) in the synthetic soil is substantially non-detectable.

The synthetic soil may comprise less than 50 ppm, less than 40 ppm, less than 30 ppm, less than 45 ppm, less than 35 ppm, less than 25 ppm, less than 20 ppm, less than 15 ppm, less than 10 ppm, less than 8 ppm, less than 6 ppm, less than 5 ppm, less than 4 ppm, less than 3 ppm, less than 2 ppm, less than 1.5 ppm, less than 1.2 ppm, less than 1.1 ppm, less than 1 ppm, less than 0.9 ppm, less than 0.8 ppm, less than 0.7 ppm, less than 0.6 ppm, less than 0.5 ppm, less than 0.4 ppm, less than 0.3 ppm, less than 0.2 ppm, or less than 0.1 ppm, lead (Pb). In one embodiment, the synthetic soil is substantially free of lead (Pb). In one embodiment, lead (Pb) in the synthetic soil is substantially non-detectable.

The present disclosure provides for a method for producing a synthetic soil from wastes, including inorganic waste composition and organic waste composition.

The inorganic waste composition may comprise fly ash (FA), ground blast furnace slag (GBFS), red mud (RM), phosphogypsum (PG), or combinations thereof.

The organic waste composition may comprise municipal solid waste (MSW), animal waste, agricultural waste, sewage sludge, or combinations thereof. MSW may include fresh MSW, and/or landfilled MSW.

The hydrolyzing composition may comprise sodium hydroxide (NaOH), potassium hydroxide (KOH), sodium bicarbonate ($NaHCO_3$), sodium silicate ($Na_2SiO_3$), or combinations thereof.

The alkaline activator may comprise sodium hydroxide (NaOH), potassium hydroxide (KOH), sodium silicate ($Na_2SiO_3$), potassium silicate ($K_2SiO_3$), or combinations thereof.

A solvent may be added during any step(s) of the present method. In one embodiment, the solvent is water.

TABLE 1

Exemplary organic waste that may be used in the present methods

| | Animal waste | Compostable green waste | Mixed refuse |
|---|---|---|---|
| pH | 5.4 | 6.9 | 5.4-6.0 |
| $H_2O$ (wt %) | 38.9 | 23.5 | 44.3 |
| Dry Matter (wt %) | 61.1 | 86.5 | 55.3 |
| Organic Carbon($gkg^{-1}$) | 141 | 163 | 208 |
| C/N | 7.65 | 11.0 | Not applicable |
| Total P($gkg^{-1}$) | 1.71 | 4.46 | 0.8 |
| Total K($gkg^{-1}$) | 1.00 | 4.50 | Not applicable |
| Calcium ($gkg^{-1}$) | 15.05 | 26.70 | — |
| Mg (g $kg^{-1}$) | 0.70 | 12.50 | — |
| Sulfur (g $kg^{-1}$) | 1.95 | 3.53 | — |
| Cu (mg $kg^{-1}$) | 18.50 | 30.00 | — |
| Zn (mg $kg^{-1}$) | 125.00 | 130.00 | — |
| Fe (mg $kg^{-1}$) | 6,830.00 | 14,800.00 | — |
| Mn (mg $kg^{-1}$) | 214.00 | 374.00 | — |
| Boron (mg $kg^{-1}$) | 14.00 | 14.00 | — |

TABLE 2

Exemplary inorganic waste that may be used in the present methods

| | Red Mud (RM) | Fly Ash (FA) | Ground Blast Furnace Slag (GBFS) | Phosphogypsum (PG) | Rice Husk Ash (RHA) |
|---|---|---|---|---|---|
| pH | 12-14 | 7-8 | 8-10 | 5-6 | 7-8 |
| $SiO_2$ (wt %) | 15 | 47 | 35 | 2.3 | 80 |
| $Al_2O_3$ (wt %) | 15 | 15.3 | 14 | 0.45 | Not applicable |
| $Fe_2O_3/Fe_3O_4$ (wt %) | 60 | 8.20 | 6.00 | 0.10 | — |
| $Na_2O$ (wt %) | 2 | 0.00 | 0.20 | 0.50 | — |
| $Ti_2O$ (wt %) | 5 | 4 | 0.5 | 0.00 | — |
| CaO (wt %) | 2.5 | 9 | 35.30 | 45.00 | — |
| MgO (wt %) | 1.5 | 0.5 | 8.30 | 0.00 | — |
| $SO_3$ (wt %) | 0.00 | 0.30 | 1.70 | 48.50 | — |
| $P_2O_5$ (wt %) | 0.00 | 0.00 | 0.00 | 3.50 | — |
| C (wt %) | 0.00 | 8.00 | 0.00 | 0.00 | 19 |
| Others (wt %) | 0.10 | 8.20 | 0.10 | 0.10 | 1.00 |

The present method for producing synthetic soil from waste may include the steps of pretreating, refining and reforming as described below.

Pretreating

The pretreating part of the present method may include activating red mud to form activated red mud (e.g., alkali-activated red mud).

For pretreating, mixed MSW may be separated/sorted by the float and sink method using activated red mud as a floatation fluid. Grits are heavier and will deposit at the bottom which can be taken out to produce synthetic stones (formula stones). Plastics are lighter and will float on the top which can be taken out (e.g., by rotary screener) for press washing and recovery. Organic fluid can be extracted to a biogeochemical reactor for further processing.

Alkali-activated red mud can kill bacteria in the waste, stop the microbial decomposition, and deodorize the waste.

The inorganic waste composition may be activated using an alkaline activator. In certain embodiments, the alkaline activator may be sodium hydroxide (NaOH), potassium hydroxide (KOH), sodium silicate ($Na_2SiO_3$), potassium silicate ($K_2SiO_3$), or combinations thereof. In one embodiment, sodium silicate ($Na_2SiO_3$) is anhydrous and/or in a powder form.

In one embodiment, sodium silicate ($Na_2SiO_3$) has the $SiO_2:Na_2O$ molar ratio ranging from 0.9:1 to 1.1:1.

In one embodiment, the inorganic waste composition includes fly ash (FA) (e.g., about 40-50 wt %), ground blast furnace slag (GBFS) (e.g., about 50-60 wt %), and sodium silicate (e.g., about 4-8 wt %). In one embodiment, the inorganic waste composition is a dry mixture.

A catalyst may be added to the reaction. The catalyst may be any suitable agent or composition that is able to increase the rate of reaction. The catalyst may be added in very small quantities, for example in the range of about 0.1 wt % to about 20 wt % of the waste.

Refining

The refining part of the present method may include organic waste hydrolysis, settling/phase separation, and inorganic waste activating.

Organic waste may comprise proteins, fats, carbohydrates, lignocelluloses etc. Organic waste may be hydrolyzed in a hydrolyzing composition such as activated red mud (e.g., alkali-activated red mud) at a basic pH (pH>7) to breakdown organic matter to amino acids (e.g., glysine, lysine, histidine, alanine, serine, proline, tyrosine, tryptophan, leucine, arginine, etc.), humic acid, fulvic acid, sugars, soap, cellulose, lignin, tannin, metallic ions, etc. Pathogens, viruses, vectors, parasites, weed seeds may be destroyed after hydrolysis.

The hydrolyzing composition may comprise one or more of the following: red mud (RM), fly ash (FA), ground blast furnace slag (GBFS), sodium hydroxide (NaOH), potassium hydroxide (KOH), and alkali salts. In certain embodiments, Fly Ash (FA) and Ground Blast Furnace Slag (GBFS) may be activated/pretreated to act as a hydrolyzing composition. For example, when the organic waste comprises biosludge, manures, feces, blood meal, bone meal and/or raw biomaterial, the chemical reaction between alkali activator with fly ash (FA) and Ground Blast Furnace Slag (GBFS) may generate an internal heat source that kick start the hydrolysis of organic waste almost simultaneously.

Alkali salts are salts that are the product of incomplete neutralization of a strong base and a weak acid. Non-limiting examples of alkali salts include sodium bicarbonate ($NaHCO_3$), sodium silicate ($Na_2SiO_3$), sodium carbonate, sodium acetate, sodium sulfide, sodium percarbonate, potassium bicarbonate ($KHCO_3$), potassium silicate ($K_2SiO_3$), potassium carbonate, potassium acetate, potassium sulfide, potassium percarbonate, potassium metabisulfite, alkali metasilicates, and alkali metal hydroxides.

Red mud is the primary by-product or waste product generated during aluminum oxide extraction from bauxite. The production of aluminum starts with the mining of bauxite ore which is crushed and ground at the aluminum plant to the desired size for efficient extraction of alumina ($Al_2O_3$) through digestion with hot sodium hydroxide liquor or caustic soda. The hot sodium hydroxide extraction process is more commonly referred to as the Bayer Process. A portion of the liquor that is removed from the alumina in the Bayer process is referred to as "red mud." After removal of red mud and fine solids from the process liquor, alumina is produced by precipitating aluminum trihydrate crystals and then calcining the crystals in a rotary kiln or fluidized bed calciner. As a result of the Bayer extraction process, the main source of liquid phase alkalinity in the red mud is caustic soda (NaOH). Solid phase alkalinity is derived from species such as calcium aluminates. The highly alkaline sodium hydroxides and sodium carbonates result in pH values ranging from about 9.75 to about 12.56. Common mineral species found in red mud are silicates, the oxides of aluminum, iron and titanium and various calcium and sodium species. U.S. Pat. No. 8,501,125. Iron minerals comprise hematite ($Fe_2O_3$), a crystalline iron oxide, and usually goethite (FeO(OH)). The aluminum minerals gibbsite (Al(OH)$_3$) and boehmite (gamma-AlOOH) are also very abundant in most red mud. The proportions of amorphous iron and aluminum range from about 0.05% to about 0.22%, and about 0.93% to about 5.02%, respectively. There can be considerable quantities of calcite ($CaCO_3$) and sodalite ($Na_8(Al_6Si_6O_{24})Cl_2$) but this can vary widely. The resistant primary minerals include quartz, zircon and ilmenite ($TiO_2$) and comprise a relatively small proportion ranging from about 6% to about 24%. There can also be minor amounts of heavy metals and radionuclides, most of which are in very stable forms. Depending upon the source and process, red muds can differ considerably in terms of mineralogical composition, and often within the same deposit. Therefore, the mineral composition of red mud varies. In one embodiment, red mud may comprise about 50 wt % water, and about 50 wt % components that are not soluble in sodium hydroxide (e.g., $Al_2O_3$ 22-28 wt %, $Fe_2O_3$ 25-35 wt %, $SiO_2$ 6-16 wt %, $TiO_2$ 8-24 wt %, $Na_2O$ (total) 4-9 wt %, $Na_2O$ (soluble) 0.5-0.7 wt %, CaO+MgO 0.5-4 wt %, and LOI 7-12 wt %).

Settling/phase separation may include adding a flocculant/coagulant which can induce rapid settling and solid-liquid phase separation.

Non-limiting examples of flocculants that can be used in this process include gypsum ($CaSO_4$), phosphogypsum (PG) and/or ordinary Portland cement (OPC, or ordinary cement) powder or fly ash C (with CaO content, e.g., greater than 40 wt %) or combinations thereof.

Non-limiting examples of coagulants that can be used in this process include water glass (e.g., sodium silicate solution) which has the SiO2:Na2O molar ratio greater than 2.0, rice husk ash (RHA), moringa oleifera seed powder, pine tree bark powder, chitosan, or combinations thereof.

The flocculants and coagulants used in this process are soil friendly materials and may be added to the Formula Soil without causing any negative effect to plants, beneficial bacteria and aquatic environment.

In one embodiment, the particles of red mud (RM) and unreacted fly ash (FA), ground blast furnace slag (GBFS) and phosphogypsum or combinations are crosslinked with each other to settle down as a heavy clay matrix and this crosslinking is a part of the process to form the biomaterial.

In one embodiment, the biomaterial (from the organic waste composition) deposits at the bottom funnel to be extracted out to the reforming unit. The decanted water is pumped back to the system to mix with activated red mud (ARM) to maintain its activity.

The inorganic waste composition may be activated separately by an alkaline activator (in a liquid, e.g., a solution, or dry mixed with the alkaline activator). The inorganic waste composition may be activated to produce a reactive zeolite gel. After mixing with an alkaline activator, the inorganic waste composition can quickly dissolve after reacting with the alkaline activator to form a colloidal zeolite gel. GBFS with high latent hydraulic property reacts both with water and the alkaline activator to release heat which raises the temperature of the immediate surrounding (e.g., to about 45° C. to 60° C. This can kick-start a series of biogeochemical reactions.

In certain embodiments, the inorganic waste (not activated by an alkaline activator) can be mixed directly with the biomaterial in a hydrolyzing composition, e.g., in a co-processing manner.

The reactive zeolite gel and the biomaterial may be mixed "wet on wet" or "dry on wet". In one embodiment, the mixing is "dry on wet" and water absorbed to the previously dry fly ash (FA) and ground blast furnace slag (GBFS) helps increase the alkaline reactivity.

The biogeochemical reactions (e.g., after mixing the biomaterial with the reactive zeolite gel, for example, step (c)) may take place and last for a period about 10 minutes to about 24 hours, about 20 minutes to about 20 hours, about 30 minutes to about 15 hours, about 40 minutes to about 10 hours, about 10 minutes to about 10 hours, about 10 minutes to about 5 hours, about 10 minutes to about 4 hours, about 10 minutes to about 2 hours, about 10 minutes to about 1 hour, about 20 minutes to about 2 hours, about 20 minutes to about 1 hour, about 10 minutes to about 45 minutes, or about 25 minutes to about 45 minutes.

The conversion and speed of reaction may depend on the alkali reactivity, internal heat generation, moisture evaporation and mixing speed.

Reforming

The reforming part of the present method may be the final stage to yield the synthetic soil. After the reactive zeolite gel is mixed with the biomaterial, a series of physical and/or bio-geochemical processes may take place as described below.

In the absorption process, Na in the zeolite (sodalite) may cation-exchange with free metallic ions ($Fe^{2+}$, $Ca^{2+}$, $Mg^{2+}$, $Zn^{2+}$, $La^{3+}$, $Y^{3+}$, $Ce^+$, $B^{3+}$, $Cu^+$, $Pb^{3+}$, $As^{3+}$, $Cr^{6+}$, $Cd^{2+}$, etc.) present in the mixture/blend.

In the complexation process, ligands such as amino acids, fulvic and humic acids may enter the zeolite pores (sodalite present in the red mud). Once the ligands enter the zeolite pores, they may chelate with previously exchanged metal ions ($Fe^{2+}$, $Ca^{2+}$, $Mg^{2+}$, $Zn^{2+}$, $La^{3+}$, $Y^{3+}$, $Ce^+$, $B^{3+}$, $Cu^+$, $Pb^{3+}$, $As^{3+}$, $Cr^{6+}$, $Cd^{2+}$ etc.) to form zeolite-encapsulated organometallic complexes.

New zeolite may form. Amino acids are prevalent in nature and may function as ligands toward the transition metals. Most coordinate to metal ions as N, O bidentate ligands, utilizing the amino group and the carboxylate. They are the "L-X" ligand. Histidine, aspartic acid, methionine, and cysteine sometimes form tridentate H,H,O, N,O,O, S,N,O complexes. Therefore, the organometallic complexes are trapped in the zeolite pores, while it is being built up to form a new zeolite-encapsulated organometallic complexes.

The synthetic soil may be further admixed with one or more fillers. The fillers may comprise one or more of the following: biochar, rice husk ash, grounded rice straw, grounded coconut shell fiber, and saw dust.

In the polycondensation process, zeolite-encapsulated organometallic complexes and celluloses in a colloidal paste might poly-condense after a filler is added, the pH lowered to below 9, the $SiO_2/Na_2O$ ratio increased to greater than 2.2, and water freed.

The fillers used in this process may include silica fume ($SiO_2$), biochar, rice husk ash (RHA), phosphogypsum (PG), ground blast furnace slag (GBFS), or combinations thereof. As the reaction proceeds, the pH may decrease to lower than 10. If necessary (e.g., if the pH is lower than pH7.5 or greater than pH9.0), the pH may be adjusted to a desired level between pH7.5-pH9.0. The fillers with pozzolanic property may neutralize the residual caustic soda as well as absorb water to dry up and make the soil softer for easy air circulation.

The product of the polycondensation may be a polymeric three-dimensional (3D) network which may be characterized as a heterogenous intergrowth of exogenous feldspars (perthite, anorthite, albite) and fossilized celluloses.

In the carbonation process, the residual $Ca^{2+}$ in the composition may react with atmospheric $CO_2$ to form calcite ($CaCO_3$).

The present disclosure also provides for a synthetic soil produced by the present methods.

Table 3 shows the mineral composition of an embodiment of the present synthetic soil (the F2 sample) analyzed by X-ray powder diffraction (XRD). The amorphous minerals are not detected by XRD.

TABLE 3

| MINERALS | FORMULA SOIL (wt %) | NATURAL SOIL (wt %) |
| --- | --- | --- |
| Amorphous | (abundant) | (Not specified) |
| Quartz -$SiO_2$ | 9-11 | 9-11 |
| Feldspar - $K_{0.5}Na0.5Al_3SiO_8$ | 4-6 | Not found |
| Gypsum - $CaSO_4 \cdot (H_2O)_2$ | 4-6 | Not found |
| Calcium Sulfate Anhydrite - $CaSO_4$ | 3-5 | Not found |
| Kaolinite -$Al_2(Si_2O_5) \cdot (OH)_4$ | 4-6 | 4-6 |
| Goethite - $Fe_2O_3 \cdot H_2O$ | 7-9 | 7-9 |
| Hematite - $Fe_2O_3$ | 6-8 | 6-8 |
| Maghemite - $\gamma Fe_2O_3$ | 3-5 | 6-8 |
| Gypsite - $Al(OH)_3$ | 2-4 | 2-4 |
| Calcite - $CaCO_3$ | 2-4 | 2-4 |

Table 4 shows the elemental composition (wt %) of an embodiment of the Formula Soil, granitic soil and basaltic soil.

TABLE 4

| | Formula Soil | Soil from granite | Soil from Basalt |
| --- | --- | --- | --- |
| $Al_2O_3$ (wt %) | 12.29 | 27.13 | 21.29 |
| CaO (wt %) | 4.29 | 0.33 | 0.46 |
| Total $Fe_2O_3$ (wt %) | 17.73 | 12.20 | 19.31 |
| MgO (wt %) | 0.90 | 0.45 | 0.59 |
| $K_2O$ (wt %) | 0.93 | 0.54 | 0.54 |
| $MnO_2$ (wt %) | 0.21 | 0.04 | 0.37 |
| $P_2O_5$ (wt %) | 0.57 | 0.08 | 0.13 |
| $Na_2O$ (wt %) | 3 | 0.40 | 0.13 |
| $TiO_2$ (wt %) | 2.41 | 1.73 | 1.92 |
| $SiO_2$ (wt %) | 60.5 | 46.7 | 45.94 |

In certain embodiments, the synthetic soil contains about 20 wt % organic matter, equivalent to about 11.7 wt % carbon (C) and about 1.17 wt % nitrogen (N), respectively. 1 kg carbon oxidized or decomposed by microbes generates approximately 3.36 kg $CO_2$. 1 kg nitrogen oxidized or decomposed by microbes generates approximately 1.57 kg $N_2O$. As $N_2O$ is approximately 298 times more powerful than $CO_2$, each ton of Formula Soil produced by the present method can save approximately 5.8 tons of GHG equivalent.

Organic matter plays many important roles in the soil ecosystem, which is of importance to sustainable agriculture. The organic matter content is one of the best indicators of soil quality, especially when the soil can be observed over a period of time. The methods of measuring soil organic matter content are well-known in the art and may involve specific equipment.

Table 5 shows the physio-chemical properties of an embodiment of the synthetic soil (Formula Soil).

TABLE 5

|  | Formula Soil | Natural Soil |
|---|---|---|
| pH | (about) 8.51 | 4.5-6.5 |
| Moisture ($H_2O$) (wt %) (Natural) | 25-30 | Lowest 5.7-Highest <15 |
| Plasticity index (IP) | 15.99 | 15-17 |
| Liquid limit | 66.84 | 41 |
| Specific gravity | 2.66 | 2.62 |
| Color | Reddish-brown | Reddish-brown |
| Organic Matter (OM) (wt %) | 20.17 | Poorest 0.2-Richest 4.0 |
| Organic Carbon (OC) (wt %) | 11.70 | Poorest |
| C/N ratio | 11 | Variable |
| Cation Exchange (CEC) mg/kg | 18.47 | 10-20 |
| $Al_2O_3$ (wt %) | 12.29 | Average: 11.5 |
| Sulfur ($S^{2-}$) | 10.50 mg/kg | Poorest <0.5-richest <6 |
| $K_2O$ (wt %) Total | 0.93 | Poorest <1.42-richest < 1.91 |
| $K_2O$ (easily digestible) | 506.15 mg/kg | Poorest <152.23-richest <200 |
| N (wt %) Total | 1.1 | Poorest <0.13-richest <0.15 |
| $P_2O_5$ (wt %) Total | 0.57 | Poorest <0.10-richest <0.16 |
| $P_2O_5$ (easily digestible) | 25.9 mg/kg | Poorest <11.8-richest <16.2 |
| CaO (wt %) | 4.2 | Average: 3.6 |
| MgO | 120 mg/kg | Poorest < 0.15-richest <100 |
| Boron | 65.5 mg/kg | Poorest < 0.1-richest <7 |
| Mo | 5.0 mg/kg | Poorest <0.05-richest <0.5 |
| Co | 67.8 ppm | Not known |
| $Fe^{3+}$ | 5,670 mg/kg | Poorest <370-richest <930 |
| Total $Fe_2O_3$ (wt %) | 17.73 | Average 20-22 |
| Mn | 137 mg/kg | Poorest <1-richest <100 |
| Zn | 22.13 mg/kg | Poorest <0.2-richest <5 |
| Cu | 89.45 mg/kg | Poorest <0.3-richest <7 |
| La | 45.8 mg/kg | Poorest <0.05-richest <6 |
| Ce | 136.5 mg/kg | Not known |

The above nutrient components may be recovered, refined and reformed with 98 wt % from the waste compositions without synthetic material addition except the soil friendly flocculant and coagulant the concentrations of which may be modified as desired.

Table 6 shows the contents of heavy metals and metalloids in an embodiment of the present synthetic soil (e.g., after being absorbed by zeolite (cation exchanged) and chelated by amino acids).

TABLE 6

| | Concentration (ppm) | | Threshold |
|---|---|---|---|
| Elements | After Absorption | Before absorption | Limit in Soil |
| Arsenic (As) | 0.88 | 72 | 15 |
| Cadmium (Cd) | not detectable | 2.0 | 1.5 |
| Lead (Pb) | not detectable | 46.0 | 70 |
| Copper (Cu) | 12.25 | 101.7 | 100 |
| Chromium (Cr) | 31.08 | 533.7 | 150 |
| Zinc (Zn) | 22.13 | 280.8 | 200 |

The synthetic soil may further comprise one or more bio-fungicides, one or more bio-pesticides, one or more bio herbicides, one or more pest control agents and/or one or more unpalatable compounds. Pellets of the synthetic soil may be coated with a coating comprising one or more bacteria, fungal spores, fungicides, pesticides, herbicides, pest control agents, and/or one or more unpalatable compounds.

In certain embodiments, in the synthetic soil, all nutrients converted into inorganic-organometallic complexes serve as an "intelligent fertilizer" which releases nutrients at the demand of the plants rather than being decomposed by microbes that generates powerful GHGs, thus making it an excellent carbon sequestration technology. This is achieved by, e.g., encapsulation in the soil and uptake by plants from the atmosphere. Thus, one (1) metric ton of synthetic soil created at least 5.8 metric tons of GHG equivalent $CO_2$ sequestered directly and indirectly by Clean Development Mechanism (CDM), further serving as a matrix for inoculating nitrogen fixing bacteria, rendering the use of synthetic fertilizer and natural manure obsolete.

In certain embodiments, in the synthetic soil, super micronutrient elements such as boron (B), molybdenum (Mo), cobalt (Co), copper (Cu), zinc (Zn), rare earth metals (La, Ce) are ready enriched by chelation or cation exchange into the soil formula during the manufacturing process, unlike the impregnation method in making the growth stimulant fertilizers. The super micro nutrient elements may support the healthy growth of plants and/or inhibit the growth of pathogens, vectors, helping plants to combat diseases better, serving as the passive agro pharmaceuticals, without using insecticides or herbicides.

The synthetic soil may act as a buffer material in regulating the soil pH, neutralizing the soil acidity, salinity, detoxicating the contaminants and retaining soil moisture and nutrients by a flexible absorption-desorption mechanism thus making it a multipurpose soil conditioner.

Lanthanum (La) and cesium (Ce) are light rare earth elements finding useful application in micronutrient fertilizer that helps to:
- increase photosynthesis of plant's leaves from 20-80% and the crop's yield from 10-20%;
- reduce the use of conventional fertilizer;
- increase the cation exchange, macro nutrient absorption capacity to reduce the synthetic fertilizer consumption;
- increase root development to increase the drought tolerance;
- increase the resistance to plant's diseases and insects enable a healthy growth of plants;
- less toxicity, rare earth residue is not much different with the crossed references;
- increase the agricultural product's typical flavors and tastes.

increase the seed's germination, shoot elongation and fruit bearing, sugar content.

Boron (B) is a micronutrient critical to the growth and health of all crops. It is a component of plant cell walls and reproductive structures. It is a mobile nutrient within the soil, meaning it is prone to movement within the soil.

Zinc (Zn) is one of the eight essential micronutrients. It is needed by plants in small amounts yet crucial to plant development. In plants, zinc is a key constituent of many enzymes and proteins. It plays an important role in a wide range of processes, such as growth hormone production and internode elongation.

Copper activates some enzymes in plants which are involved in lignin synthesis and can be essential in several enzyme systems. It is also required in the process of photosynthesis, is essential in plant respiration and assists in plant metabolism of carbohydrates and proteins.

Cobalt (Co) is a trace element in plants. It is a component of a number of enzymes and increases the drought resistance of seeds. In legumes, cobalt is important for nitrogen fixation by the bacteria that are associated with legumes.

Molybdenum (Mo) is an important trace element for plants because it is an essential component of the enzyme nitrogenase, which helps convert atmospheric nitrogen into ammonia, molybdenum powder is used as fertilizer for some plants, such as cauliflower.

The waste may be an industrial waste, an agricultural waste, a human municipal waste, fertilizers, domestic sewage, and industrial effluents.

Inorganic waste (or inorganic waste composition) may comprise, for example, fly ash (FA), bottom ash, ground blast furnace slag (GBFS), red mud (RM), phosphogypsum (PG), etc. or combinations thereof. As used herein, the terms "inorganic waste" and "inorganic waste composition" are interchangeable.

The term "ash" may refer to fly ash, bottom ash and all types of alkali-containing ash from any source including, but not limited to, coal burning, wood burning and other biomass burning.

In addition, waste may include materials which are not derived from combustion, including, but not limited to, other types of ashes, contaminated soils, sewage sludge materials.

Organic waste (or organic waste composition) may comprise municipal solid waste (MSW), animal waste (e.g., animal by-products), agricultural waste, vegetable waste, sewage sludge, vegetable waste, food waste, or combinations thereof. Organic waste may comprise, for example, waste from abattoirs, waste from meat processing or packaging, fallen stock, animal carcasses, food waste, animal excrement, for example, cow slurry, pig or cow dung, poultry litter, animal bedding, waste from the food industry, abattoir blood etc., or combinations thereof. Organic waste may comprise waste selected from the group consisting of food scraps, meat, dairy and vegetable matter. Organic waste may comprise animal waste, vegetable waste or mixed animal and vegetable waste. Organic waste may comprise biowaste from sources, including, but not limited to, food waste, produce waste, discarded plant harvest matter (leaves and stalks), animal manure, etc. While not intended to be limiting, organic waste can comprise or be derived from plant and/or animal byproducts, seaweed, dairy product waste, livestock manure, liquid manure, worm castings, peat, guano, compost, blood meal, bone meal, fish meal, decomposing crop residue, cheese whey, mixed liquor from food and/or livestock processing facilities, wastewater from food processing operations, and any combination thereof. As used herein, the terms "organic waste" and "organic waste composition" are interchangeable. U.S. Pat. Nos. 10,000,428 and 10,351,482.

Animal waste may include animal by-products, dead animal bodies and portions thereof, as well as animal excreta.

During the processing of animals for meat production or other uses, relatively large amounts of the animal are removed, discarded and not sold on to an end user. Animal waste includes animal by-products such as bone, blood, gut content, wool, fur and feathers for example. Animal by-products also include animal waste such as chicken-litter, cow slurry and pig or horse manure. Animal waste may comprise feces, urine, food, bedding materials, such as wood chips and/or sawdust, feathers, and other materials. In one embodiment, animal waste may contain one or more harmful microorganisms, such as bacteria, viruses, protozoa, and/or other parasites or pathogens. Animal excreta include, but are not limited to, manure, which may be feces, urine, and added products such as water, wasted feed, hair, and bedding for the animals. The manure may come from any animal source, such as pigs, poultry (e.g., chickens, turkey etc.), cows, sheep, goats, hogs and horses, even humans.

Manure excreted by poultry and other livestock typically contains a variety of pathogens, including *Salmonella*, Coliform, Fecal Coliform, Soil Transmitted Helminths (hookworm, *Ascaris*, and whipworm), *Campylobacter*, Avian Influenza, *Histoplasma, Capsulatum* Fungus, and *Escherichia coli*. The presence of these pathogens poses health risks to farm workers handling the manure. In addition, the use or distribution of manure containing these pathogens on agricultural crops can pose health and environmental concerns to farm workers and consumers.

Animal waste can be provided from an on-site facility or can be delivered, for example, in bulk quantities by truck. It should also be understood that the properties, for example, the nutrient content and physical properties of a given animal waste product can vary depending upon, for example, the type of animal and/or rearing or growth facility, length of time the animal waste has been stored, environmental conditions, etc. In one aspect, properties, such as, for example, nitrogen content, phosphorus content, potassium content, calcium content, sulfur content, boron content, magnesium content, molybdenum content, sodium content, manganese content, zinc content, iron content, copper content, moisture, and pH, can vary depending upon the type of animal and/or rearing or growth facility. For example, poultry litter animal waste can contain wood chips, sawdust, feathers, and/or other materials in addition to feces, and the moisture content can vary depending upon whether the litter originated in a broiler or egg-laying facility. Poultry litter can comprise a variety of materials of varying size.

Vegetable waste may include kitchen waste, bedding from animals, fruit or vegetable processing waste, for example, fruit peels, sugar cane waste.

As used herein, the term "about" as a modifier to a quantity is intended to mean±10% inclusive of the quantity being modified.

As used herein, the percentage "% (w/w)" or "wt %" is percent weight to weight; the percentage "% (w/v)" is percent weight to volume (w in gram and v in milliliter); the percentage "% (v/v)" is percent volume to volume.

The term "substantially free" of an agent should be understood as meaning free of the agent, or that any amount of the agent present in the composition (e.g., synthetic soil) is so low so as not to have any effect on the function of the composition (e.g., synthetic soil), on the outcome of usage of the composition (e.g., synthetic soil) or on the properties of the composition (e.g., synthetic soil) after it is taken out of the composition. In certain embodiment, the term "substantially free" of an agent means that the agent is less than about 5% w/w (or % w/v, or % v/v), less than about 4% w/w (or % w/v, or % v/v), less than about 3% w/w (or % w/v, or % v/v), less than about 2% w/w (or % w/v, or % v/v), less than about 1% w/w (or % w/v, or % v/v), less than about 0.5% w/w (or % w/v, or % v/v), less than about 0.2% w/w (or % w/v, or % v/v), less than about 0.1% w/w (or % w/v, or % v/v), less than about 0.05% w/w (or % w/v, or % v/v), less than about 0.02% w/w (or % w/v, or % v/v), or less than about 0.01% w/w (or % w/v, or % v/v) in the composition (e.g., synthetic soil).

The present invention may be better understood by reference to the following non-limiting examples, which are presented in order to more fully illustrate the preferred embodiments of the invention. They should in no way be construed to limit the broad scope of the invention.

EXAMPLES

Example 1: Preparing Formula Soil from Animal Manure

Step 1: Preparing for Precursors Materials and Feeds
  Cow dung: (organic waste) 20 liters
  Activated red mud solution: 5 liters or 5 kgs by dry weight.
  (The activated red mud was prepared as described herein. It can be used for purging of bad odors emitted by microbes in animal manure and sewage.)
  Fly ash (inorganic waste): 20 liters
  Ground Blast Furnace Slag (inorganic waste): 15 liters
  Coconut fiber: 20 liters
  Rice Husk Ash: 10 liters
  Phosphogysum: (inorganic waste) 10 liters
  River sand: 20 liters
  Basaltic soil: 20 liters
  Sodium Hydroxide: 1 kg
  Sodium Silicate or water glass: 4 litres (concentration about 1-3 wt %)
  (Water glass with the $SiO_2:Na_2O$ molar ratio ranging from 2.9 to 3.2 can be used. When NaOH was added, the total [$Na_2O+SiO_2$] increased which reduced the $SiO_2$:$Na_2O$ molar ratio towards more basic (more alkaline). When more NaOH was added, the $SiO_2:Na_2O$ molar ratio further decreased to lower than 1.45. In one embodiment, the $SiO_2:Na_2O$ molar ratio may decrease to about 0.9:1 to about 1.1:1, at which point it can become an alkaline activator.)

Step 2: Mixing of Materials Using a 150 Liters Planetary Concrete Mixer
  Soaking cow dung into activated red mud to deodorize the odors. The complete deodorization was for about 1 to 2 minutes indicating that the cow dung has been totally hydrolyzed.
  Adding 10 liters of water
  Mixing fly ash, ground blast furnace slag, sodium hydroxide and sodium silicate with the hydrolyzed cow dung (biomaterial) for 30 to 45 minutes to yield a thick and viscous paste. Sodium hydroxide and sodium silicate can react to form a strong alkaline activator with the $SiO_2:Na_2O$ molar ratio ranging from about 0.9:1 to about 1.1:1 to hydrolyze the cow dung, fly ash and ground blast furnace slag at the same time. All the mixing was carried out at an ambient temperature.
  The hydrolyzing of the organic waste was performed at a pH ranging from about pH13 to about pH14. The activating of the inorganic waste was performed at a pH ranging from about pH13 to about pH14 (e.g., about pH14).

Step 3: Reforming Soil:
  Adding coconut fiber and rice husk ash to the mixture in Step 2, and mixing well for 15-20 minutes. Rice Husk Ash containing chiefly $SiO_2$ can react with residual NaOH to form additional $Na_2SiO_3$, causing pH to drop to lower than pH 9. The NaOH concentration after mixing and reaction taking place can decrease to about 0.001 to 0.01 wt % or to almost 0 wt %. Then the composition began to polymerize, and the Formula Soil was being reformed.
  Adding Phosphogypsum and mixing well for 15-20 minutes. $CaSO_4$ will react with residual $Na_2SiO_3$ to form $CaSiO_3$ and $Na_2SO_4$, thus the concentration of $Na_2SiO_3$ (dropped to almost 0.0 wt %.
  Adding Basaltic soil and mixing well for 15-20 minutes.
  Adding river sand and mixing well for 15-20 minutes.
  Adding 1 kg Portland cement to dry up the Formula Soil composition.

Example 2: Preparing Formula Soil from MSW

The MSW contained food waste and compostable greenery.

Step 1: Preparing for Precursors Materials and Feeds
  MSW: 20 liters
  Fly ash: 20 liters
  Ground Blast Furnace Slag: 15 liters
  Coconut fiber: 20 liters
  Rice Husk Ash: 10 liters
  Phosphogypsum: 10 liters
  River sand: 20 liters
  Basaltic soil: 20 liters
  Sodium hydroxide: 1 kg
  Sodium silicate: 4 liters (concentration about 1-3 wt %)

Step 2: Mixing of Materials Using a 150 Liters Planetary Concrete Mixer
  Mixing MSW with fly ash, ground blast furnace slag, sodium hydroxide and sodium silicate well together for 30 to 45 minutes to yield a thick and viscous paste. Sodium hydroxide and sodium silicate acted as both the hydrolyzing composition for the organic waste and the alkaline activator for the inorganic waste. Sodium hydroxide can react with sodium silicate or water glass to form a strong hydrolyzing composition/alkaline activator with the $SiO_2:Na_2O$ molar ratio ranging from about 0.9:1 to about 1.1:1 to hydrolyze both the organic waste (MSW) and inorganic waste (fly ash and ground blast furnace slag) at the same time. All the mixing was carried out at an ambient temperature. The hydrolyzing of the organic waste was performed at a pH ranging from about pH13 to about pH14. The activating of the inorganic waste was performed at a pH ranging from about pH13 to about pH14 (e.g., about pH14).

Step 3: Reforming Soil:
  Adding coconut fiber and rice husk ash to the mixture in Step 2, and mixing well for 15-20 minutes. Rice Husk Ash containing chiefly $SiO_2$ can react with residual NaOH to form additional $Na_2SiO_3$, causing pH to drop to lower than pH 9. The NaOH concentration after mixing and reaction taking place can decrease to about 0.001 to 0.01 wt % or to almost 0 wt %. Then the composition began to polymerize, and the Formula Soil was being reformed.

Adding Phosphogypsum and mixing well for 15-20 minutes. $CaSO_4$ will react with residual $Na_2SiO_3$ to form $CaSiO_3$ and $Na_2SO_4$, thus the concentration of $Na_2SiO_3$ dropped to almost 0.0 wt %.

Adding Basaltic soil and mixing well for 15-20 minutes.

Adding river sand and mixing well for 15-20 minutes.

Adding 1 kg Portland cement to dry up the Formula Soil Composition.

Example 3: Making Formula Stone for Use as Curbstones

Step 1: Preparing the Precursor Material

Fly ash: 20 kgs dry weight

Ground Blast Furnace Slags: 20 kgs dry weight

Wetted Coarse aggregates: 30 liters

Metasilicate anhydrous: 3.2 kgs

Water glass: 2 liters (sodium silicate concentration: about 1-3 wt %)

Step 2: Mixing Device: 150 Liters Planetary Type Mixer

Mixing Fly ash, Ground Blast Furnace Slag and wetted coarse aggregate together and mixing well for about 30 minutes for homogenization.

Spraying water to the mixture to reach a moisture content of about 15-20%.

Mixing metasilicate anhydrous (with the $SiO_2:Na_2O$ molar ratio ranging from about 0.9 to 1.1) with the dampened mixture. Mixing well for about 30 minutes. The metasilicate/Fly ash weigh ratio is about 16:100.

As a result, metasilicate anhydrous absorbs moisture to form a strong alkaline activator to hydrolyze the Fly ash to produce a zeolite gel to free more water for total dissolution of metasilicate anhydrous powder and Ground Blast Furnace Slag hydrate to generate an internal heat source to kick start the geopolymerization process.

Step 3: Compressing Device: 80-Ton Compressor for Concrete Brick Making Machine.

Spraying the mold with water glass

Inserting the welded wire messes for reinforcement to increase the flexural strength of the stone body.

Filling in the mold with the dampened mixture from Step 2.

Compressing the dampened mixture with pressure, causing high intensity friction forces to drive the water outward and to facilitate the chemical reactions as the solid particles became denser and more compacted and bonded together stronger by the zeolite gel.

Transferring the formed stone to the hot steam chamber for curing for about 8 hours. The material set and hardened in about 6 to 28 days to reform the synthetic stone.

In another method, the formed stone was transferred to a 600 w Microwave Chamber for curing in about 3-6 minutes. The material set and hardened in about 15 to 30 minutes to reform the synthetic stone.

Example 4: Making Formula Stone for Use as Super-Sized Rock Blocks

Step 1: Preparing the Precursor Material

Fly ash: 50 kgs dry weight

Ground Blast Furnace Slags: 50 kgs dry weight

Welded wire messes in the form of a gabion filled with rock fragments, pebbles, gravels, glass bottles with size ranging from about 5 cm×5 cm to about 10 cm×20 cm.

Metasilicate anhydrous: 8 kgs

Waterglass: 4 liters (with the $SiO_2:Na_2O$ molar ratio of about 3.2) (sodium silicate concentration: about 1-3 wt %)

Aggregates: 200 liters (rock fragments, pebbles, gravels, glass bottles with size ranging from 5 cm×5 cm to about 10 cm×20 cm.)

Step 2: Mixing in 150-Liter Planetary Type Mixer

Mixing Fly ash, Ground Blast Furnace Slag together and mixing well for 30 minutes for homogenization.

Spraying water to the mixture to reach a moisture content of about 30%.

Mixing Metasilicate anhydrous with the dampened mixture, mixing well for about 30 minutes. The metasilicate/Fly ash weigh ratio is about 16:100.

Adding water glass and mixing well for 10 minutes to yield a high flow fluid.

Step 3: Casting

A watertight mold was prepared to avoid fluid leak. Concrete pump was used for quick delivery of the fluid into the mold.

The fluid-like gel filled in the void inside the gabion and was quickly self-compacted, set, cured, hardened, binding the aggregates, rock fragments, pebbles, gravel and wire meshes together in about 6 to 28 days to reform the rock block. As the pH of the zeolite gel dropped to below pH9, the gel polymerized. After curing, the material set and hardened. The concentrations of Metasilicate Anhydrous and Sodium Silicate or water glass reduced to close to 0 wt %.

The scope of the present invention is not limited by what has been specifically shown and described hereinabove. Those skilled in the art will recognize that there are suitable alternatives to the depicted examples of materials, configurations, constructions and dimensions. Numerous references, including patents and various publications, are cited and discussed in the description of this invention. The citation and discussion of such references is provided merely to clarify the description of the present invention and is not an admission that any reference is prior art to the invention described herein. All references cited and discussed in this specification are incorporated herein by reference in their entirety. Variations, modifications and other implementations of what is described herein will occur to those of ordinary skill in the art without departing from the spirit and scope of the invention. While certain embodiments of the present invention have been shown and described, it will be obvious to those skilled in the art that changes and modifications may be made without departing from the spirit and scope of the invention. The matter set forth in the foregoing description is offered by way of illustration only and not as a limitation.

What is claimed is:

1. A method for producing a synthetic soil from wastes, the method comprising:

(a) hydrolyzing an organic waste composition using a hydrolyzing composition to produce a biomaterial, wherein the hydrolyzing composition has a pH ranging from about pH 13 to about pH 14;

(b) activating an inorganic waste composition using an alkaline activator to produce a reactive zeolite gel, wherein the alkaline activator has a pH ranging from about pH 13 to about pH 14; and (c) mixing the biomaterial with the reactive zeolite gel to produce the synthetic soil, wherein the hydrolyzing composition comprises alkali-activated red mud.

2. The method of claim 1, wherein the alkaline activator comprises one selected from the group consisting of sodium hydroxide or lye (NaOH), potassium hydroxide (KOH), sodium silicate anhydrous ($Na_2SiO_3$), potassium silicate ($K_2SiO_3$), and combinations of any two or more thereof with molar ratio of $SiO_2/Na_2O$ or $SiO_2/K_2O$ ranging from about 0.9 to about 1.1.

3. The method of claim 1, wherein the inorganic waste composition comprises one selected from the group consisting of fly ash (FA), ground blast furnace slag (GBFS), red mud (RM), phosphogypsum (PG), rice husk ash (RHA), and combinations of any two or more thereof.

4. The method of claim 1, wherein the organic waste composition comprises one selected from the group consisting of municipal solid waste (MSW), animal waste, agricultural waste, green waste, mixed refuse, sewage sludge, and combinations of any two or more thereof.

5. The method of claim 1, wherein in step (c) the biomaterial and the reactive zeolite gel is mixed at a volume ratio ranging from about 5:1 to about 1:5.

6. The method of claim 1, wherein in step (c) the mixing is performed at a temperature ranging from 20° C. to 25° C. or at an ambient temperature for 2 hours to 4 hours.

7. The method of claim 1, wherein the biomaterial generated after hydrolysis of the organic waste composition is an active biosolid sludge comprising amino acids or amino acids prevalent in nature which function as ligands toward transition metal and co-ordinate to metallic ions as N,O bidentate ligands or H,H,O, N,O,O, S,N,O tridentate ligands to form organometallic complexes which are trapped in the zeolite pores, while it is being built up to form a new zeolite-encapsulated organometallic complexes rendering carbon (C) and nitrogen (N) and sulfur (S) elements sequestered into the synthetic soil instead of being decomposed by bacteria which causes biogas emission primarily consisting of methane ($CH_4$), carbon dioxide ($CO_2$), sulfur hydrogen ($H_2S$) and nitrogen oxide $N_2O$ (greenhouse gases equivalent) leading to global warming.

8. The method of claim 7, wherein amino acids functioning as ligands which co-ordinates to metal ions as N,O bidentate ligands or H,H,O, N,O,O, S,N,O tridentate ligands using amino group and the carboxylate to form a bidentate or tridentate organometallic complexes trapped in the zeolite pores, while it is built up to form a new zeolite-encapsulated organometallic complexes rendering nitrogen (N) sequestered in the soil structure as a slow released fertilizer feeding the plant instead of being decomposed by bacteria causing emission of greenhouse gas.

9. The method of claim 1, wherein the reactive zeolite gel is created by reacting and dissolving the inorganic waste composition comprising one selected from the group consisting of fly ashes (FA), ground blast furnace (GBFS), rice husk ash (RHA) and combinations of any two or more thereof, with the alkaline activator composition comprises one selected from the group consisting of sodium hydroxide (NaOH), potassium hydroxide (KOH), sodium silicate ($Na_2SiO_3$), potassium silicate ($K_2SiO_3$) and combinations of any two or more thereof.

10. The method of claim 1, wherein the synthetic soil comprises one or more minerals selected from the group consisting of Quartz ($SiO_2$), Feldspar Potassium ($K_{0.5}Na_{0.5}AlSi_3O_8$), Gypsum ($CaSO_4)2(H_2O)$, Illite ($KAl_2Si_3AlO_{10} \cdot 2(H_2O)$), Kaolinite ($Al_2(Si_2O_5)2(OH)$), Calcite ($CaCO_3$), and Hematite ($Fe_2O_3$), and comprising one or more organic matters selected from the group consisting of organometallic-inorganic complexes, humic acid, fulvic acid and humus rendering synthetic soil a suitable plant growing medium.

11. The method of claim 1, wherein $Na^+$ in the zeolite available in red mud or new zeolite gel present in the mixture or blend cation-exchanges with free metallic ions which is selected from the group consisting of $K^+$, $Fe^{2+}$, $Ca^{2+}$, $Mg^{2+}$, $Zn^{2+}$, $La^{3+}$, $Y^{3+}$, $Ce^+$, $B^{3+}$, $Cu^+$, $Pb^{3+}$, $As^{3+}$, $Cr^{3+}$, and $Cd^{2+}$ to render synthetic soil free from heavy metals and metalloids.

12. The method of claim 1, wherein the synthetic soil absorbs atmospheric carbon dioxide ($CO_2$) which reacts with $Ca^{2+}$ to form calcite mineral ($CaCO_3$) helping the reduction of greenhouse gas emission.

13. The method of claim 1, wherein the method further comprises adding one or more nutrients or minerals selected from the group consisting of magnesium salts, ammonia ($NH_3$) and phosphogypsum, which is used to produce the synthetic soil with particular balance of nitrogen content, phosphate content and potassium content (NPK Content) that is suitable for specific soil type and/or crop type so that nitrogen (N) and phosphorus (P) elements are sequestered in the synthetic soil instead of being decomposed by bacteria to produce nitrogen oxide ($N_2O$), which is a major greenhouse gas (GHG), and to release phosphorus (P) to water source to harm the aquatic environment.

14. A method for producing a synthetic soil from wastes, the method comprising:
(a) hydrolyzing an organic waste composition using a hydrolyzing composition to produce a biomaterial, wherein the hydrolyzing composition has a pH ranging from about pH 13 to about pH 14;
(b) activating an inorganic waste composition using an alkaline activator to produce a reactive zeolite gel, wherein the alkaline activator has a pH ranging from about pH 13 to about pH 14; and
(c) mixing the biomaterial with the reactive zeolite gel to produce the synthetic soil,
wherein in step (a) the hydrolyzing is performed at a temperature ranging from 20° C. to 25° C. or at an ambient temperature for 8 hours to 16 hours.

15. A method for producing a synthetic soil from wastes, the method comprising:
(a) hydrolyzing an organic waste composition using a hydrolyzing composition to produce a biomaterial, wherein the hydrolyzing composition has a pH ranging from pH 13 to pH 14;
(b) activating an inorganic waste composition using an alkaline activator to produce a reactive zeolite gel, wherein the alkaline activator has a pH ranging from pH 13 to pH 14; and
(c) mixing the biomaterial with the reactive zeolite gel to produce the synthetic soil,
wherein in step (b) the activating is performed at a temperature ranging from 20° C. to 25° C. or at an ambient temperature for 8 hours to 16 hours.

* * * * *